(12) United States Patent
Nemoto

(10) Patent No.: US 12,411,352 B2
(45) Date of Patent: Sep. 9, 2025

(54) COMPOSITE DIFFRACTION ELEMENT, INSTRUMENT, AND IMAGE PROJECTION SYSTEM

(71) Applicant: SONY SEMICONDUCTOR SOLUTIONS CORPORATION, Kanagawa (JP)

(72) Inventor: Kazuhiko Nemoto, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 835 days.

(21) Appl. No.: 17/435,526

(22) PCT Filed: Mar. 3, 2020

(86) PCT No.: PCT/JP2020/008787
§ 371 (c)(1),
(2) Date: Sep. 1, 2021

(87) PCT Pub. No.: WO2020/184268
PCT Pub. Date: Sep. 17, 2020

(65) Prior Publication Data
US 2022/0057548 A1    Feb. 24, 2022

(30) Foreign Application Priority Data

Mar. 8, 2019    (JP) ................. 2019-042370

(51) Int. Cl.
*G02B 27/42*        (2006.01)
*G02B 5/02*         (2006.01)
(Continued)

(52) U.S. Cl.
CPC ....... *G02B 27/4272* (2013.01); *G02B 5/0252* (2013.01); *G02B 5/18* (2013.01);
(Continued)

(58) Field of Classification Search
CPC .... G02B 27/4272; G02B 5/0252; G02B 5/18; G02B 5/1842; G02B 5/32; G02B 27/0172
(Continued)

(56) References Cited

U.S. PATENT DOCUMENTS 5,471,326 A  * 11/1995 Hall ................ G02B 26/106
                                                      359/18
6,313,931 B1    11/2001 Gnaedig et al.
(Continued)

FOREIGN PATENT DOCUMENTS

GB        2335757 A  *  9/1999  ............... G02B 5/32
JP      2000-028925        1/2000
(Continued)

OTHER PUBLICATIONS

International Search Report prepared by the Japan Patent Office on Mar. 31, 2020, for International Application No. PCT/JP2020/008787.

*Primary Examiner* — George G. King
(74) *Attorney, Agent, or Firm* — Sheridan Ross PC

(57) ABSTRACT

The present technology aims to provide a diffraction element that functions like a transmissive hologram, and more particularly, aims to provide a diffraction element suitable for forming an image projection system. The present technology provides a composite diffraction element that includes a stack structure including a first diffraction element, a second diffraction element, and a third diffraction element in this order. The second diffraction element diffractively reflects light that has passed through the first diffraction element and reached the second diffraction element, toward the first diffraction element. The first diffraction element diffractively reflects the light diffractively reflected by the second diffraction element, toward the third diffraction element. The third diffraction element transmits the light diffractively reflected by the first diffraction element, and diffractively (Continued)

reflects zeroth-order light that has passed through the first diffraction element and the second diffraction element.

15 Claims, 10 Drawing Sheets

(51) Int. Cl.
*G02B 5/18* (2006.01)
*G02B 5/32* (2006.01)
*G02B 27/01* (2006.01)

(52) U.S. Cl.
CPC .............. *G02B 5/1842* (2013.01); *G02B 5/32* (2013.01); *G02B 27/0172* (2013.01)

(58) Field of Classification Search
USPC ......................................................... 359/562
See application file for complete search history.

(56) References Cited

U.S. PATENT DOCUMENTS

| | | | |
|---|---|---|---|
| 2010/0033779 A1* | 2/2010 | Kurashige | G03H 1/0011 359/2 |
| 2012/0170090 A1 | 7/2012 | Dimov | |
| 2012/0206812 A1 | 8/2012 | Saito | |
| 2016/0004077 A1 | 1/2016 | Yanagisawa | |

FOREIGN PATENT DOCUMENTS

| | | |
|---|---|---|
| JP | 2001-509912 | 7/2001 |
| JP | 2006-098820 | 4/2006 |
| JP | 5996093 B2 | 9/2016 |
| WO | WO 2014/155588 | 10/2014 |
| WO | WO 2019/235059 | 12/2019 |

* cited by examiner

FIG. 4A
| EXAMPLES OF ANGLE DESIGN (UNIT: deg) | | EXAMPLE 1 | EXAMPLE 2 | EXAMPLE 3 | EXAMPLE 4 | EXAMPLE 5 | EXAMPLE 6 |
|---|---|---|---|---|---|---|---|
| In-Out ANGLE MARGIN | | 10 | 10 | 10 | 7 | 7 | 7 |
| CONNECTION ANGLE SHIFT AMOUNT | | 5 | 5 | 5 | 5 | 5 | 5 |
| SECOND DIFFRACTION ELEMENT | INCIDENT ANGLE | 35 | 30 | 25 | 35 | 30 | 25 |
| | EXIT ANGLE | 40 | 35 | 30 | 40 | 35 | 30 |
| FIRST DIFFRACTION ELEMENT | INCIDENT ANGLE | 40 | 35 | 30 | 40 | 35 | 30 |
| | EFFECTIVE RANGE | ±25 | ±20 | ±15 | ±28 | ±23 | ±18 |
| THIRD DIFFRACTION ELEMENT | INCIDENT ANGLE | 35 | 30 | 25 | 35 | 30 | 25 |
| | EXIT ANGLE | 50 | 45 | 40 | 47 | 42 | 37 |
FIG. 4B
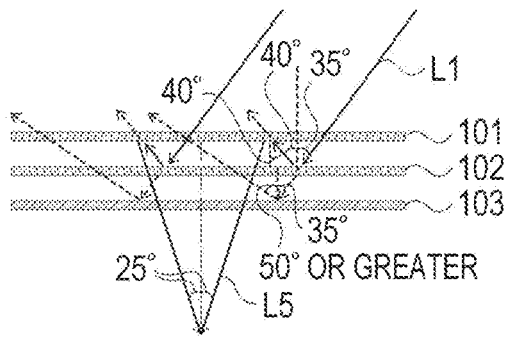
FIG. 5
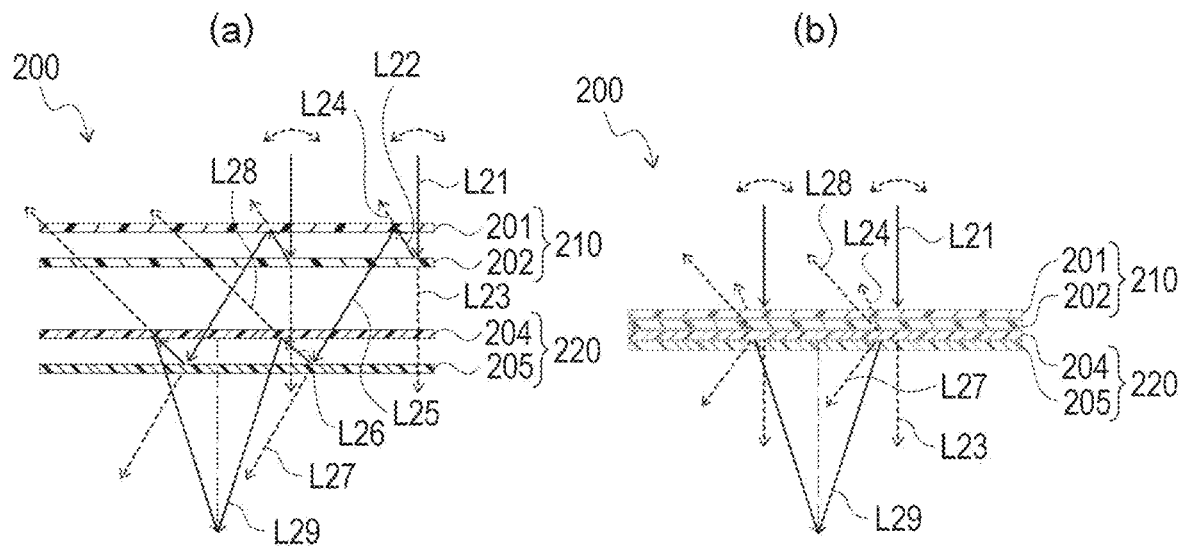

FIG. 6

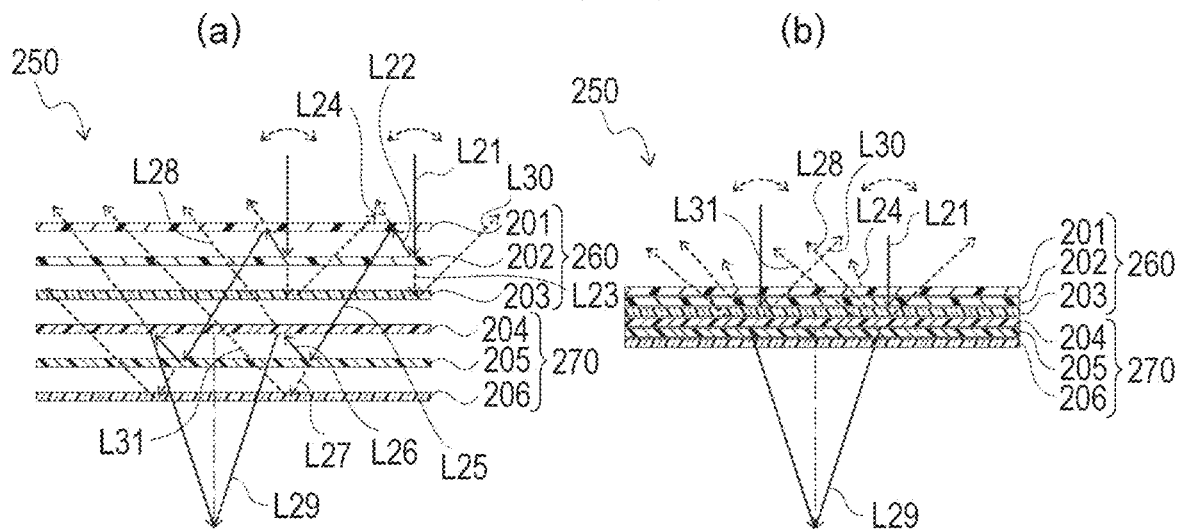

FIG. 7A

| EXAMPLES OF ANGLE DESIGN (UNIT: deg) | | | EXAMPLE 21 | EXAMPLE 22 | EXAMPLE 23 | EXAMPLE 24 | EXAMPLE 25 | EXAMPLE 26 |
|---|---|---|---|---|---|---|---|---|
| In-Out ANGLE MARGIN | | | 10 | 10 | 10 | 7 | 7 | 7 |
| CONNECTION ANGLE SHIFT AMOUNT | | | 5 | 5 | 5 | 5 | 5 | 5 |
| FIRST COMBINATION | SECOND DIFFRACTION ELEMENT | INCIDENT ANGLE | 0 | 0 | 0 | 0 | 0 | 0 |
| | | EXIT ANGLE | 30 | 25 | 20 | 30 | 25 | 20 |
| | FIRST DIFFRACTION ELEMENT | INCIDENT ANGLE | 30 | 25 | 20 | 30 | 25 | 20 |
| | | EXIT ANGLE | 35 | 30 | 25 | 35 | 30 | 25 |
| | THIRD DIFFRACTION ELEMENT | INCIDENT ANGLE | 0 | 0 | 0 | 0 | 0 | 0 |
| | | EXIT ANGLE | 45 | 40 | 35 | 42 | 37 | 32 |
| SECOND COMBINATION | SECOND DIFFRACTION ELEMENT | INCIDENT ANGLE | 35 | 30 | 25 | 35 | 30 | 25 |
| | | EXIT ANGLE | 40 | 35 | 30 | 40 | 35 | 30 |
| | FIRST DIFFRACTION ELEMENT | INCIDENT ANGLE | 40 | 35 | 30 | 40 | 35 | 30 |
| | | EFFECTIVE RANGE | ±25 | ±20 | ±15 | ±28 | ±23 | ±18 |
| | THIRD DIFFRACTION ELEMENT | INCIDENT ANGLE | 35 | 30 | 25 | 35 | 30 | 25 |
| | | EXIT ANGLE | 50 | 45 | 40 | 47 | 42 | 37 |

FIG. 7B

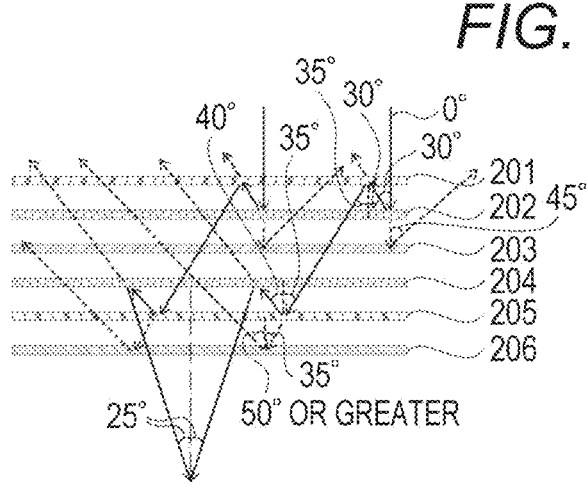

FIG. 21

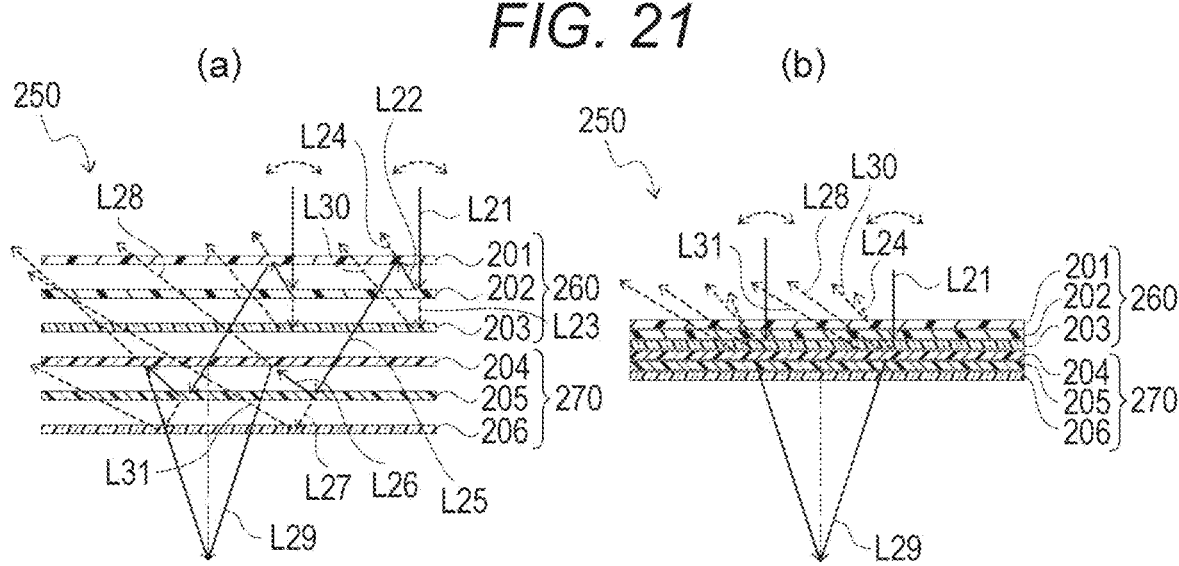

FIG. 22A

| EXAMPLES OF ANGLE DESIGN (UNIT: deg) | | | EXAMPLE 27 | EXAMPLE 28 | EXAMPLE 29 | EXAMPLE 30 | EXAMPLE 31 | EXAMPLE 32 |
|---|---|---|---|---|---|---|---|---|
| In-Out ANGLE MARGIN | | | 10 | 10 | 10 | 7 | 7 | 7 |
| CONNECTION ANGLE SHIFT AMOUNT | | | 5 | 5 | 5 | 5 | 5 | 5 |
| FIRST COMBINATION | SECOND DIFFRACTION ELEMENT | INCIDENT ANGLE | 0 | 0 | 0 | 0 | 0 | 0 |
| | | EXIT ANGLE | 30 | 25 | 20 | 30 | 25 | 20 |
| | FIRST DIFFRACTION ELEMENT | INCIDENT ANGLE | 30 | 25 | 20 | 30 | 25 | 20 |
| | | EXIT ANGLE | 35 | 30 | 25 | 35 | 30 | 25 |
| | THIRD DIFFRACTION ELEMENT | INCIDENT ANGLE | 0 | 0 | 0 | 0 | 0 | 0 |
| | | EXIT ANGLE | 40 | 35 | 30 | 37 | 32 | 27 |
| SECOND COMBINATION | SECOND DIFFRACTION ELEMENT | INCIDENT ANGLE | 35 | 30 | 25 | 35 | 30 | 25 |
| | | EXIT ANGLE | 50 | 45 | 40 | 44 | 39 | 34 |
| | FIRST DIFFRACTION ELEMENT | INCIDENT ANGLE | 50 | 45 | 40 | 44 | 39 | 34 |
| | | EFFECTIVE RANGE | ±25 | ±20 | ±15 | ±28 | ±23 | ±18 |
| | THIRD DIFFRACTION ELEMENT | INCIDENT ANGLE | 35 | 30 | 25 | 35 | 30 | 25 |
| | | EXIT ANGLE | 60 | 55 | 50 | 51 | 46 | 41 |

FIG. 22B

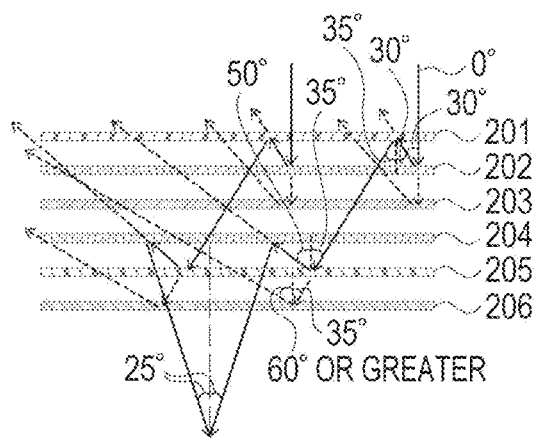

COMPOSITE DIFFRACTION ELEMENT, INSTRUMENT, AND IMAGE PROJECTION SYSTEM

CROSS REFERENCE TO RELATED APPLICATIONS

This application is a national stage application under 35 U.S.C. 371 and claims the benefit of PCT Application No. PCT/JP2020/008787 having an international filing date of 3 Mar. 2020, which designated the United States, which PCT application claimed the benefit of Japanese Patent Application No. 2019-042370 filed 8 Mar. 2019, the entire disclosures of each of which are incorporated herein by reference.

TECHNICAL FIELD

The present technology relates to composite diffraction element, instrument, and image projection system. More particularly, the present technology relates to a composite diffraction element that has optical characteristics similar to those of a transmissive diffraction element, and an instrument and an image projection system that include the composite diffraction element.

BACKGROUND ART

In recent years, attention has been drawn to the technology for superimposing an image on a scenery of the outside world such as a scenery in the real world, for example. The technology is also called the augmented reality (AR) technology. One of the products using this technology is a head-mounted display. A head-mounted display is mounted on the user's head during use. By an image display method using a head-mounted display, when light from the head-mounted display, as well as light from the outside world, reaches the user's eyes, for example, the user feels as if the image formed by the light from the display were superimposed on an image of the outside world.

One example of such head-mounted displays is an image projection system that includes a projection light source that projects image display light, and a diffraction element that is separated from the projection light source and guides the image display light to the eyes. A diffraction element that is possibly used in the image projection system is disclosed in Patent Document 1 mentioned below, for example. Patent Document 1 mentioned below discloses an invention relating to an optical combination including a first optical element and a second optical element that are arranged so that each optical element transmits or reflects an incident light ray, depending on the incident angle of the light ray.

CITATION LIST

Patent Document

Patent Document 1: Japanese Patent Application Laid-Open No. 2000-28925

SUMMARY OF THE INVENTION

Problems to be Solved by the Invention

Among the components of an image projection system that includes a projection light source that projects image display light and a diffraction element that is separated from the projection light source and guides the image display light to the eyes, the diffraction element can be provided at a lens portion of eyeglasses, for example. In this case, the diffraction element is designed to transmissively diffract the image display light, or can be formed as a transmissive hologram. The transmissive hologram preferably performs selective transmissive diffraction only on the image display light and transmits light from an external scenery, for example, or the transmissive hologram is expected to have wavelength selectivity and angle selectivity. On the other hand, to be provided at the lens portion, the transmissive hologram is preferably formed as a thin film. However, it is difficult for a thin transmissive hologram to have wavelength selectivity and angle selectivity. Therefore, it is not easy to create a transmissive hologram that is suitable as the diffraction element of the image projection system.

Furthermore, transmissive holograms have a large effect on diffraction efficiency due to variation in film thickness (see H. Kogelnik and C. V. Shank, "Coupled-Wave Theory of Distributed Feedback Lasers", J. Appl. Phys., 43, 5, pp. 2327-2335 (1972), for example), and therefore, it is difficult to stably produce transmissive holograms having the diffraction performance the diffraction element is expected to have.

The present technology aims to provide a diffraction element that functions like a transmissive hologram, and more particularly, aims to provide a diffraction element suitable for forming the above image projection system.

Solutions to Problems

The present technology provides a composite diffraction element that includes
  a stack structure including a first diffraction element, a second diffraction element, and a third diffraction element in this order,
  in which the second diffraction element diffractively reflects light that has passed through the first diffraction element and reached the second diffraction element, toward the first diffraction element,
  the first diffraction element diffractively reflects the light diffractively reflected by the second diffraction element, toward the third diffraction element, and
  the third diffraction element transmits the light diffractively reflected by the first diffraction element, and diffractively reflects zeroth-order light that has passed through the first diffraction element and the second diffraction element.

The third diffraction element may diffractively reflect the zeroth-order light that has passed through the first diffraction element and the second diffraction element, in a direction in which the zeroth-order light is transmitted by both the first diffraction element and the second diffraction element.

According to one embodiment of the present technology, the composite diffraction element as a whole may have optical characteristics of a transmissive diffraction element.

According to a preferred embodiment of the present technology, the composite diffraction element as a whole may have optical characteristics of a transmissive diffraction lens.

The composite diffraction element of the present technology may have a structure in which two sets of the stack structures are stacked.

One stack structure of the two sets of the stack structures may have optical characteristics of a transmissive diffraction element, and the other stack structure may have optical characteristics of a transmissive diffraction lens. Light obtained by diffraction performed by the one stack structure may enter the other stack structure, and the other stack structure may diffract and condense the light.

The first diffraction element, the second diffraction element, and the third diffraction element that constitute the composite diffraction element of the present technology may each diffract light of a plurality of wavelengths.

At least one of the first diffraction element, the second diffraction element, and the third diffraction element that constitute the composite diffraction element of the present technology may be a stack of a plurality of diffraction element layers.

According to a preferred embodiment of the present technology, a transparent plate may be inserted in the stack structure.

According to a preferred embodiment of the present technology, the first diffraction element, the second diffraction element, and the third diffraction element may be stacked on one surface of a transparent plate.

The composite diffraction element according to the present technology may be disposed for use in front of an eye, and be used for diffracting image display light to reach the eye.

The image display light may be emitted from an image projection device separated from the composite diffraction element.

Each of the first diffraction element, the second diffraction element, and the third diffraction element may be a reflective hologram.

The present technology may also provide an instrument that includes:
  a composite diffraction element that includes a stack structure including a first diffraction element, a second diffraction element, and a third diffraction element in this order,
  the second diffraction element diffractively reflecting light that has passed through the first diffraction element and reached the second diffraction element, toward the first diffraction element,
  the first diffraction element diffractively reflecting the light diffractively reflected by the second diffraction element, toward the third diffraction element,
  the third diffraction element transmitting the light diffractively reflected by the first diffraction element, and diffractively reflecting zeroth-order light that has passed through the first diffraction element and the second diffraction element; and
  a transparent plate for placing the composite diffraction element in front of an eye.

The present technology may also provide an image projection system that includes:
  a composite diffraction element that includes a stack structure including a first diffraction element, a second diffraction element, and a third diffraction element in this order,
  the second diffraction element diffractively reflecting light that has passed through the first diffraction element and reached the second diffraction element, toward the first diffraction element,
  the first diffraction element diffractively reflecting the light diffractively reflected by the second diffraction element, toward the third diffraction element,
  the third diffraction element transmitting the light diffractively reflected by the first diffraction element, and diffractively reflecting zeroth-order light that has passed through the first diffraction element and the second diffraction element; and
  an image projection device that projects image display light toward the composite diffraction element.

BRIEF DESCRIPTION OF DRAWINGS

FIG. 4A is examples of angle design for a composite diffraction element according to the present technology.

FIG. 4B is a diagram for explaining an example of angle design.

FIG. 5 is a schematic diagram of a composite diffraction element of a reference example.

FIG. 6 is a schematic diagram of an example of a composite diffraction element according to the present technology.

FIG. 7A is examples of angle design for a composite diffraction element according to the present technology.

FIG. 7B is a diagram for explaining an example of angle design.

FIG. 21 is a schematic diagram of an example of a composite diffraction element according to the present technology.

FIG. 22A is examples of angle design for a composite diffraction element according to the present technology.

FIG. 22B is a diagram for explaining an example of angle design.

MODE FOR CARRYING OUT THE INVENTION

Figure 1:
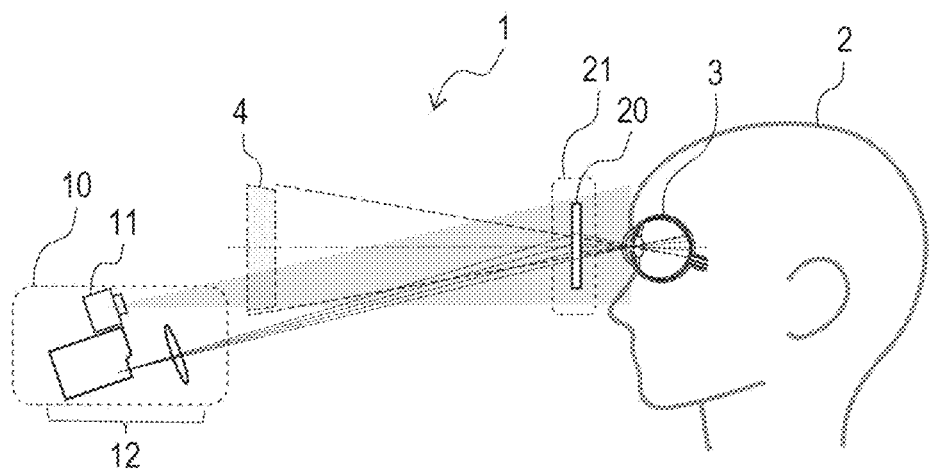
FIG. 1 is a diagram showing an example of an image projection system in which a composite diffraction element according to the present technology is used.

The following is a description of preferred embodiments for carrying out the present technology. Note that the embodiments described below are typical embodiments of the present technology, and the scope of the present technology is not limited to these embodiments. Note that explanation of the present technology will be made in the following order.

1. First embodiment (composite diffraction element)
   (1) Description of a first embodiment
   (2) First example of the first embodiment (an example of a composite diffraction element having a structure in which three diffraction elements are stacked)
      (2-1) Composite diffraction element of a reference example
      (2-2) Composite diffraction element according to the present technology
      (2-3) Examples of angle design for a composite diffraction element according to the present technology
   (3) Second example of the first embodiment (an example of a composite diffraction element having two sets of structures in each of which three diffraction elements are stacked)
      (3-1) Composite diffraction element of a reference example
      (3-2) Composite diffraction element according to the present technology
      (3-3) Examples of angle design for a composite diffraction element according to the present technology
      (3-4) Composite diffraction element according to the present technology
      (3-5) Example of angle design for a composite diffraction element according to the present technology
   (4) Third example of the first embodiment (an example of a color-compatible composite diffraction element)
      (4-1) Description of a color-compatible composite diffraction element
      (4-2) Estimates of diffraction efficiencies and zeroth-order light reduction effects
   (5) Example of a method for manufacturing a composite diffraction element according to the present technology
2. Second embodiment (instruments)
3. Third embodiment (image projection systems)
   (1) Description of a third embodiment
   (2) Example configuration of an image projection device

1. First Embodiment (Composite Diffraction Element)

(1) Description of a First Embodiment

An example of an image projection system in which a composite diffraction element according to the present technology is used is described below with reference to FIG. 1. An image projection system 1 shown in FIG. 1 includes an image projection device 10, and a diffraction element 20 separated from the image projection device 10.

The image projection device 10 is equipped with a projection optical system, and image display light is projected from the image projection device 10 toward the diffraction element 20 that is set in front of both eyes or one eye.

The diffraction element 20 can be held in front of the eye (both eyes or one eye) 3 of a user 2. To be held in this manner, the diffraction element 20 can be provided on glasses 21 that is designed to hold the diffraction element 20 in front of the eye and is worn on the head. The diffraction element 20 diffracts the image display light projected from the image projection device 10 and brings the image display light to the eye. As a result, the user 2 of the image projection system 10 can view an image 4 (a still image or a moving image) formed with the image display light. Further, the diffraction element 20 transmits light from the space in front of the glasses 21 (in the line-of-sight direction of the user 2), and guides the light to the eye of the user 2. Thus, the image 4 is recognized as an image existing in that space by the user 2.

As described above, in view of diffraction performance (such as diffraction efficiency, wavelength selectivity, and angle selectivity, for example), it may be difficult to use a transmissive hologram as the diffraction element 20 of the image projection system 1. Therefore, the use of a reflective hologram in place of a transmissive hologram has been considered, because it is easier to control the diffraction performance of a reflective hologram than to control the diffraction performance of a transmissive hologram. For example, it is possible to use a stack of two reflective holograms as a composite diffraction element that substantially behaves like a transmissive hologram. However, a reflective hologram has the problem of zeroth-order light, and therefore, not all the light that has reached the reflective hologram is reflectively diffracted, and part of the light is transmitted. The transmitted zeroth-order light turns into stray light, and might affect image display with diffracted first-order light.

The two optical elements constituting the optical combination disclosed in Patent Document 1 described above are considered to be reflective holograms, or a stack of two reflective holograms. However, Patent Document 1 described above does not mention any zeroth-order light (stray light) that passes through a reflective hologram. In a case where the optical combination is used as the diffraction element 20 of the image projection system 1 without any change, a problem due to the zeroth-order light might occur.

Further, to reduce generation of the zeroth-order light, the diffraction efficiency of the reflective holograms may be maximized. In that case, it is possible to reduce the amount of zeroth-order light by increasing the diffraction efficiency, but the thickness of the reflective holograms needs to be made greater so that the reflectance becomes higher or an of the hologram material becomes dramatically larger. In the former case, due to the increase in the thickness of the reflective holograms, the reflective holograms have a very narrow angle selectivity and wavelength dependence, and margins cannot be allowed for the angle range and the wavelength width of input light. Because of that, there is a possibility that movement or shakes of the image projection device 10 or the diffraction element 20 cannot be covered, and a wavelength change due to a change in the temperature of the light source for the image projection device 10 cannot be covered. Particularly, in a case where the diffraction element 20 is attached to glasses, a margin for covering movement of the glasses is required, but the problem that the movement cannot be covered due to the narrow angle range of input light becomes conspicuous. In the latter case, on the other hand, it is not realistic to prepare such a hologram material because of its difficulty.

A composite diffraction element according to the present technology has a stack structure including a first diffraction element, a second diffraction element, and a third diffraction element in this order. The second diffraction element diffractively reflects light that has passed through the first diffraction element and reached the second diffraction element, toward the first diffraction element. The first diffraction element diffractively reflects the light diffractively reflected by the second diffraction element, toward the third diffraction element. The third diffraction element transmits the light diffractively reflected by the first diffraction element, and diffractively reflects zeroth-order light that has passed through the first diffraction element and the second diffraction element. A more specific configuration of the composite diffraction element will be described later in (2).

With the stack structure including the three diffraction elements in that order, the composite diffraction element according to the present technology can substantially function as a transmissive hologram and prevent problems due to zeroth-order light.

The functions of a transmissive hologram are provided particularly by the combination of the first diffraction element and the second diffraction element.

Also, the problem due to zeroth-order light is solved particularly by the third diffraction element. Further, as the problem due to zeroth-order light is solved by the third diffraction element, the film thickness does not need to be increased to enhance reflectance, and the an of the hologram material does not need to be drastically increased as described above. Accordingly, the angle range or the wavelength range of input light does not become narrower due to an increase in the film thickness, resulting in difficulty in use of the diffraction element. Also, a general-purpose material that is inexpensive, easily available, has stable characteristics, and is easy to use can be used as the material of the diffraction element. Further, it is possible to adjust the thickness of the diffraction element to an easy-to-use thickness.

In this specification, a composite diffraction element means a diffraction element formed with two or more diffraction element groups. The two or more diffraction element groups can have different diffraction performances from each other. The two or more diffraction element groups are stacked, and the stack structure forms the composite diffraction element.

Also, in this specification, light to be diffracted by the composite diffraction element is laser light, for example, and can preferably be laser light for presenting an image to a user. In this specification, light for presenting an image to a user is also referred to as image display light.

According to a preferred embodiment of the present technology, the third diffraction element can diffractively reflect zeroth-order light that has passed through the first diffraction element and the second diffraction element, in a direction in which the zeroth-order light is transmitted by both the first diffraction element and the second diffraction element. With this arrangement, the problem due to zeroth-order light can be solved more reliably.

The thickness of the first diffraction element can be 1 μm to 20 μm, or preferably 3 μm to 10 μm, for example, in a case where the diffraction element is a single-layer diffraction element. In a case where the first diffraction element is a stack of a plurality of diffraction element layers described later in (4), the thickness of each layer in the plurality of diffraction element layers can be 1 μm to 20 μm, or preferably 3 μm to 10 μm, for example. These numerical ranges also apply to the second diffraction element and the third diffraction element.

Each of the three diffraction elements constituting the composite diffraction element according to the present technology can be a reflective hologram, or particularly, a volume-phase reflective hologram. In this specification, a reflective hologram can mean a hologram that diffractively reflects at least part of incident light that has entered at a predetermined incident angle. The rest of the incident light can pass through the reflective hologram. A reflective hologram can be made thinner, and it is easy to control the diffraction performance thereof, such as diffraction efficiency, wavelength selectivity, and angle selectivity, for example. As all the three diffraction elements are reflective holograms, desired performance can be stably imparted to the composite diffraction element, and further, the composite diffraction element is easy to manufacture. Furthermore, it is easy to increase the transmission efficiency of light (such as light from an external scenery, for example) from the space in front of the glasses (in the direction of the line of sight of the user 2) in the image projection system 1, for example.

The first diffraction element, the second diffraction element, and the third diffraction element can selectively diffractively reflect, at a predetermined exit angle, light that has entered at a predetermined incident angle. Note that these diffraction elements do not need to diffractively reflect all the light that has entered at the predetermined incident angle, or may transmit part of the light that has entered at the predetermined incident angle. The incident angles of light to be diffractively reflected by these three diffraction elements are preferably different from one another.

Further, the first diffraction element, the second diffraction element, and the third diffraction element can selectively diffractively reflect light having a predetermined wavelength. The wavelengths of light to be diffractively reflected by these three diffraction elements are preferably the same.

According to one embodiment of the present technology, the composite diffraction element as a whole can have optical characteristics of a transmissive diffraction element. That is, the composite diffraction element according to the present technology can function as a transmissive grating.

According to a particularly preferred embodiment of the present technology, the composite diffraction element as a whole may have optical characteristics of a transmissive diffraction lens. For example, the first diffraction element can diffractively reflect the light diffractively reflected by the second diffraction element, to condense the light. That is, the light travels so as to be focused in the space on the side of the third diffraction element. With this arrangement, the composite diffraction element according to the present technology can function as a transmissive hologram lens. As the composite diffraction element of the present technology that functions as a transmissive hologram lens is used as the diffraction element 20 in the image projection system 10 described above, it is possible to present an image to a user through a Maxwell view, for example.

According to another embodiment of the present technology, the composite diffraction element may have a structure in which two sets of stack structures each including the first diffraction element, the second diffraction element, and the third diffraction element are stacked. That is, in the composite diffraction element, six diffraction elements are laminated. In this embodiment, one stack structure can have the optical characteristics of a transmissive diffraction element, and the other stack structure can have the optical characteristics of a transmissive diffraction lens.

In this embodiment, light obtained by diffraction performed by the one stack structure can enter the other stack structure, and the other stack structure can diffract the light. More preferably, light obtained by diffraction performed by the one stack structure can enter the other stack structure, and the other stack structure can diffract and condense the light.

With such a combination of two stack structures, the angular relationship between the incident and exit optical axes with respect to the entire composite diffraction element can be easily controlled. For example, both optical axis angles of incident light that enters the composite diffraction element and exit light from the composite diffraction element can be set at 0 degrees. Also, the composite diffraction element can have a lens function that is similar to that of a transmissive thick lens.

The composite diffraction element according to this embodiment can also be used as the diffraction element 20 in the image projection system 10 described above, and enables image presentation to a user through a Maxwell view, for example.

This embodiment will be described in greater detail later in (3).

At least one (one, two, or all three, for example) of the first diffraction element, the second diffraction element, and the third diffraction element constituting the composite diffraction element of the present technology may be a stack of a plurality of diffraction element layers that have different wavelength selectivities from one another. With this stack, a high diffractive reflectance can be achieved independently for each wavelength. This embodiment will be described in greater detail later in (4).

According to one embodiment of the present technology, a transparent plate may be inserted in the stack structure. That is, the transparent plate may be inserted between two adjacent diffraction element layers included in the stack structure.

For example, the transparent plate may be inserted between the first diffraction element and the second diffraction element, or the transparent plate may be inserted between the second diffraction element and the third diffraction element.

In the former case, the first diffraction element, the transparent plate, the second diffraction element, and the third diffraction element are stacked in this order. In the latter case, the first diffraction element, the second diffraction element, the transparent plate, and the third diffraction element are stacked in this order.

Further, in a case where at least one diffraction element among the first diffraction element, the second diffraction element, and the third diffraction element is a stack of a plurality of diffraction element layers as explained later in (4), the transparent plate may be inserted between the layers in the plurality of diffraction element layers.

In this embodiment, the transparent plate may be a lens of eyewear (eyeglasses, for example), an inner visor or an outer visor of a helmet, or the like, for example, but is not limited to these. For example, the three diffraction elements may be divided and disposed on the two surfaces of an eyeglass lens.

According to another embodiment of the present technology, the first diffraction element, the second diffraction element, and the third diffraction element may be stacked in this order on one surface of a transparent plate. That is, in this embodiment, the first diffraction element, the second diffraction element, the third diffraction element, and the transparent plate may be stacked in this order, or the transparent plate, the first diffraction element, the second diffraction element, and the third diffraction element may be stacked in this order. The transparent plate in this embodiment can also be one of the materials described above. For example, the stack structure formed with the three diffraction elements may be disposed on one surface of an eyeglass lens.

As the composite diffraction element according to the present technology is disposed on a transparent plate as described above, the composite diffraction element is easily held in front of the eye, and is easily used as the diffraction element 20 in the image projection system 1 described above, for example.

The composite diffraction element according to the present technology may be disposed for use in front of an eye, and be used for diffracting image display light to reach the eye. The image display light can be emitted from an image projection device separated from the composite diffraction element. As the composite diffraction element is used in this manner, the composite diffraction element can play a role as the diffraction element 20 in the image projection system 1 described above, for example.

The composite diffraction element according to the present technology may be used in applications other than image projection. For example, in various applications in which the use of a transmissive diffraction element (particularly, a transmissive diffraction lens) is required, the composite diffraction element according to the present technology may be used. The composite diffraction element according to the present technology may be used in an optical information reading device such as a two-dimensional code (QR code (registered trademark) or bar code) reader, for example, or may be used as an optical filter in various kinds of devices.

(2) First Example of the First Embodiment (an Example of a Composite Diffraction Element Having a Structure in which Three Diffraction Elements are Stacked)

Figure 2:
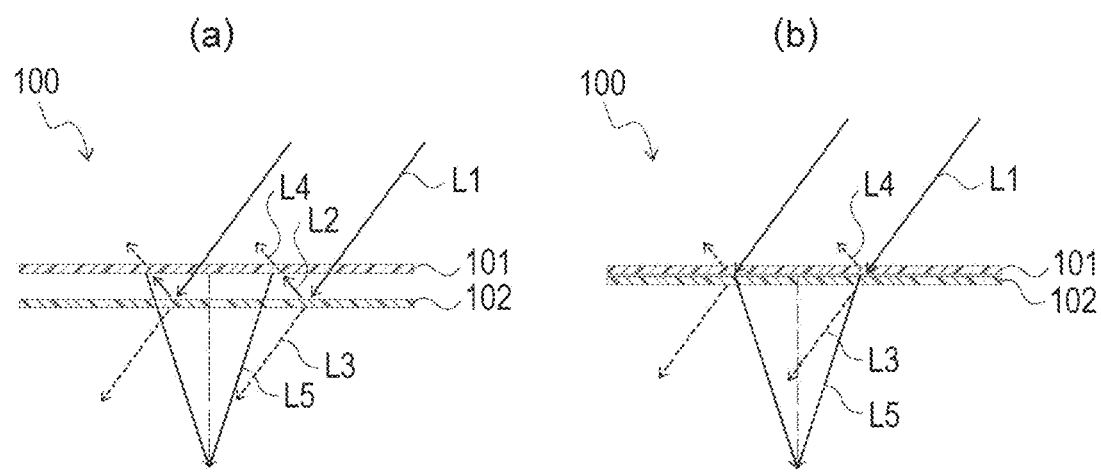
FIG. 2 is a schematic diagram of a composite diffraction element of a reference example.

FIG. 2 shows a schematic diagram of a composite diffraction element of a reference example for easier understanding of the present technology. FIG. 2(a) is a diagram for explaining how light travels in the composite diffraction element, and, for convenience of explanation, the two diffraction element layers constituting the composite diffraction element are separated from each other. FIG. 2(b) shows a state in which the two diffraction element layers are stacked.

Figure 3:
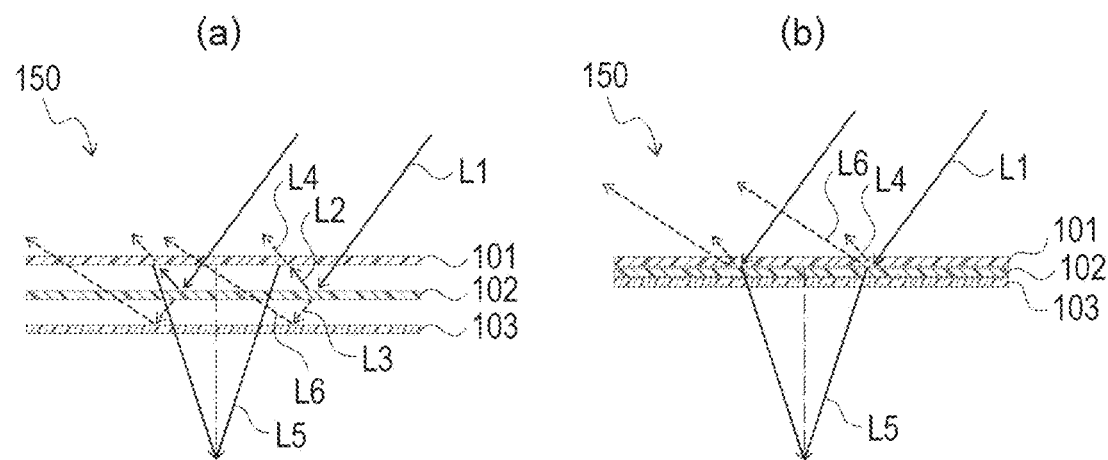
FIG. 3 is a schematic diagram of an example of a composite diffraction element according to the present technology.

FIG. 3 shows a schematic diagram of an example of a composite diffraction element according to the present technology. FIG. 3(a) is a diagram for explaining how light travels in the composite diffraction element, like FIG. 2(a). FIG. 3(b) shows a state in which three diffraction element layers are stacked.

In the description below, a composite diffraction element according to the present technology is explained with reference to FIGS. 2 and 3.

(2-1) Composite Diffraction Element of a Reference Example

A composite diffraction element 100 shown in FIGS. 2(a) and 2(b) includes a first diffraction element 101 and a second diffraction element 102. These two diffraction elements are stacked as shown in FIG. 2(b). As shown in FIGS. 2(a) and 2(b), the composite diffraction element 100 diffracts light L1 that has reached the composite diffraction element 100 from the upper side of the paper surface, and causes light L5 to travel toward the lower side of the paper surface. The light L1 is image display light or the like, for example, but is not limited to this. The composite diffraction element 100 has substantially the same diffraction function as a transmissive hologram lens that transmissively diffracts the light L1 to obtain the light L5. In the description below, how light travels in the composite diffraction element 100 is explained. In the description below, how the light indicated by a solid line in FIG. 2(a) travels (how the target light travels) is first explained, followed by explanation of how the light indicated by a dashed line travels (how the unnecessary zeroth-order light travels).

(How the Target Light Travels)

The first diffraction element 101 transmits the light L1 that has entered the element. The light L1 that has passed through the first diffraction element 101 reaches the second diffraction element 102.

The second diffraction element 102 diffractively reflects the light L1 that has passed through the first diffraction element 101, toward the first diffraction element 101. The diffractively reflected light L2 travels toward the first diffraction element 101.

The first diffraction element 101 diffractively reflects the diffractively reflected light L2 toward the second diffraction element 102. The diffractively reflected light L5 travels toward the second diffraction element 102.

The first diffraction element 101 is capable of diffractively reflecting and condensing the light L2, preferably as shown in FIG. 2(a).

The second diffraction element 102 transmits the light L5 diffractively reflected by the first diffraction element 101. The transmitted light L5 can be used as desired light, or as image display light, for example. Being condensed as described above, the light L5 can be used for image presentation by a Maxwell view, for example.

(How the Unnecessary Zeroth-Order Light Travels)

Not all the light L1 is diffractively reflected by the second diffraction element 102, and part of the light L1 might pass through the second diffraction element 102. That is, the transmitted light L3 (dashed line) is zeroth-order light.

Not all the light L2 is diffractively reflected by the first diffraction element 101, and part of the light L2 might pass through the first diffraction element 101. That is, the transmitted light L4 (dashed line) is zeroth-order light.

As described above, depending on the combination of the first diffraction element 101 and the second diffraction element 102, the composite diffraction element 100 has a diffraction function similar to that of a transmissive diffraction element, or particularly, has a function similar to that of a transmissive diffraction lens. However, the light L3, which is zeroth-order light, also travels on the lower side of the paper surface on which the diffractively reflected light L5 travels. Therefore, the light L3 might affect the use of the light L5. For example, the light L3 might have an undesired effect on image display with the light L5.

(2-2) Composite Diffraction Element According to the Present Technology

As shown in FIG. 3, a composite diffraction element 150 according to the present technology includes a third diffraction element 103, in addition to the first diffraction element 101 and the second diffraction element 102. The first diffraction element 101, the second diffraction element 102, and the third diffraction element 103 are stacked in this order, as shown in FIGS. 3(a) and 3(b). The first diffraction element 101, the second diffraction element 102, and the third diffraction element 103 have the optical characteristics explained in the description below. A diffraction element having the optical characteristics can be formed with a reflective hologram, or particularly, a volume-phase reflective hologram, for example. A diffraction element having the optical characteristics may be manufactured by a method known in the art, and can be manufactured by the manufacturing method described below in (4), for example.

Like the composite diffraction element 100 shown in FIG. 2, the composite diffraction element 150 diffracts light L1 that has reached the composite diffraction element 150 from the upper side of the paper surface, and causes light L5 to travel toward the lower side of the paper surface. The light L1 is image display light or the like, for example, but is not limited to this. The composite diffraction element 150 has substantially the same diffraction function as a transmissive hologram lens that transmissively diffracts the light L1 to obtain the light L5. In the description below, how light travels in the composite diffraction element 150 is explained. How the light indicated by a solid line in FIG. 3(a) travels (how the target light travels) is first explained, followed by explanation of how the light indicated by a dashed line travels (how the unnecessary zeroth-order light travels).

(How the Target Light Travels)

The first diffraction element 101 transmits the light L1 that has entered the element. The light L1 that has passed through the first diffraction element 101 reaches the second diffraction element 102.

The second diffraction element 102 diffractively reflects the light L1 that has passed through the first diffraction element 101, toward the first diffraction element 101. The diffractively reflected light L2 travels toward the first diffraction element 101.

The first diffraction element 101 diffractively reflects the diffractively reflected light L2 toward the second diffraction element 102 and the third diffraction element 103. The first diffraction element 101 diffractively reflects and condenses the light L2, preferably as shown in FIG. 3(a). The diffractively reflected light L5 travels toward the second diffraction element 102.

The second diffraction element 102 transmits the light L5 diffractively reflected by the first diffraction element 101. The transmitted light L5 reaches the third diffraction element 103.

The third diffraction element 103 transmits the light L5 transmitted by the second diffraction element 102. The light L5 that has passed through the third diffraction element 103 is used as desired light, or as image display light, for example. Being condensed as described above, the light L5 can be used for image presentation by a Maxwell view, for example.

(How the Unnecessary Zeroth-Order Light Travels)

Not all the light L1 is diffractively reflected by the second diffraction element 102, and part of the light L1 might pass through the second diffraction element 102. That is, the transmitted light L3 is zeroth-order light. The transmitted zeroth-order light L3 travels to the third diffraction element 103.

Not all the light L2 is diffractively reflected by the first diffraction element 101, and part of the light L2 might pass through the first diffraction element 101. That is, the transmitted light L4 is zeroth-order light.

The third diffraction element 103 diffractively reflects the zeroth-order light L3 in the direction in which the light is transmitted by both the second diffraction element 102 and the first diffraction element 101. The light L6 diffractively reflected by the third diffraction element 103 travels toward the second diffraction element 102.

The second diffraction element 102 transmits the light L6. The light L6 that has passed through the second diffraction element 102 further travels toward the first diffraction element 101.

The first diffraction element 101 transmits the light L6 that has passed through the second diffraction element 102.

As described above, the third diffraction element 103 causes at least part of the zeroth-order light L3 to travel to the upper side of the paper surface of FIG. 3, instead of to the lower side of the paper surface of FIG. 3. Thus, the influence of the zeroth-order light L3 on the light L5 can be reduced, and the quality of the light L5 can be increased.

(2-3) Examples of Angle Design for a Composite Diffraction Element According to the Present Technology Examples of angle design (examples of optical path design) for incident light and reflected light regarding each of the diffraction elements constituting the composite diffraction element 150 shown in FIG. 3 are now described, with reference to FIGS. 4A and 4B. FIG. 4A shows six examples of angle design. FIG. 4B is a diagram for explaining Example 1 of the six examples of angle design.

The angles shown in FIG. 4A are described below.

"In-Out angle margin" is the difference between the incident angle (In) of the light L1 entering the second diffraction element 102 and the maximum value of the exit angle (Out) of the light L5 that is diffractively reflected and condensed by the first diffraction element 101.

"Connection angle shift amount" is the difference between the incident angle of the light L1 entering the second diffraction element 102 and the exit angle of the light L2 diffractively reflected by the second diffraction element 102. The connection angle shift amount may be 0° (which means that there is no connection angle shift amount), for example, but is preferably more than 0°, more preferably 1° or greater, or even more preferably 3° or greater. The connection angle shift amount can be 10° or smaller, for example, or preferably 8° or smaller. As the diffraction performance of the second diffraction element 102 is designed to have the connection angle shift amount, reflected light formed from the light L1 by the second diffraction element 102 can be distinguished from diffractively reflected light formed from the light L1 by the second diffraction element 102.

The "incident angle" of the "second diffraction element" is the incident angle of the light L1 entering the second diffraction element 102.

The "exit angle" of the "second diffraction element" is the exit angle of the light L2 with respect to the second diffraction element 102. The "exit angle" of the "second diffraction element" is greater than the "incident angle" of the "second diffraction element" by the connection angle shift amount.

The "incident angle" of the "first diffraction element" is the incident angle of the light L2 entering the first diffraction element 101. The "incident angle" of the "first diffraction element" may be equal to the "exit angle" of the "second diffraction element".

The numerical values shown in the "effective range" of the "first diffraction element" is the maximum values of the exit angle of the light L5 that is diffractively reflected and condensed by the first diffraction element 101. For example, in Example 1, "±25" is shown, which means that the range of the exit angle of the light L5 that is diffractively reflected and condensed by the first diffraction element 101 is from −25° to +250.

The "incident angle" of the "third diffraction element" is the incident angle of the zeroth-order light L3 that has passed through the second diffraction element 102 and is entering the third diffraction element 103. The "incident angle" of the "third diffraction element" may be equal to the "incident angle" of the "second diffraction element".

The "exit angle" of the "third diffraction element" is the minimum value of the exit angle of the light L6 diffractively reflected by the third diffraction element 103, with respect to the third diffraction element 103. That is, the diffraction performance of the third diffraction element 103 may be preferably designed to diffractively reflect the light L3 at an exit angle equal to or greater than the minimum value. Thus, it is possible to more reliably prevent the light L6 from being reflected or diffractively reflected by the second diffraction element 102 or the first diffraction element 101, and traveling to the lower side of the paper surface in the traveling direction of the light L5.

The "exit angle" of the "third diffraction element" is preferably greater than the exit angle of the light L2 with respect to the second diffraction element 102 by 1° or more, or preferably by 3° or more, or more preferably by 5° or more, for example. Even more preferably, the "exit angle" of the "third diffraction element" is greater than the exit angle of the light L2 with respect to the second diffraction element 102 by the In-Out angle margin or more. With this arrangement, it is possible to more reliably prevent the light L6 from being diffractively reflected by the first diffraction element 101.

Regarding Example 1 of the six examples of angle design shown in FIG. 4A, how to design the angles of incident light and reflected light with respect to each diffraction element is described with reference to FIG. 4B.

In Example 1 of the examples of angle design, the second diffraction element 102 diffractively reflects, at an exit angle of 40°, the light L1 that has entered at an incident angle of 35°. That is, the second diffraction element 102 diffractively reflects the light L1 by a connection angle shift amount of 5°. The light L2 diffractively reflected by the second diffraction element 102 travels to the first diffraction element 101, and enters the first diffraction element 101 at an incident angle of 40°.

Note that the first diffraction element 101 transmits the light L1 that has entered at an incident angle of 35°.

The first diffraction element 101 diffractively reflects the light L2 that has entered at an incident angle of 40°, at an exit angle within the effective range of −25° to +25°. As shown in FIG. 3, the light L2 is diffractively reflected so as to be condensed.

The second diffraction element 102 and the third diffraction element 103 transmit the light L5 diffractively reflected at an exit angle within the effective range for the first diffraction element 101.

The second diffraction element 102 does not diffractively reflect all of the light L1 that has entered at an incident angle of 35°, but can transmit part of the light L1 to generate zeroth-order light. The transmitted zeroth-order light L3 enters the third diffraction element 103 at an incident angle of 35°.

The third diffraction element 103 diffractively reflects the zeroth-order light L3 at an exit angle of 50° or greater. With this arrangement, it is possible to prevent the zeroth-order light L3 from affecting the light L5.

The diffractively reflected light L6 travels toward the second diffraction element 102 and the first diffraction element 101, and enters at an incident angle of 50° or greater.

Both the second diffraction element 102 and the first diffraction element 101 transmit the light L6 that has entered at an incident angle of 50° or greater. With this arrangement, it is possible to prevent the light L6 from being reflected or diffractively reflected by the second diffraction element 102 and the first diffraction element 101, and affecting the light L5.

The effects of the present technology can be achieved with the above angle design. Also, in Examples 2 to 6, the effects of the present technology can be achieved as in Example 1.

As described above, the first diffraction element, the second diffraction element, and the third diffraction element that constitute the composite diffraction element according to the present technology can diffractively reflect light that has entered at a predetermined incident angle in a selective manner. Note that these diffraction elements do not need to diffractively reflect all the light that has entered at the predetermined incident angle, or may transmit part of the light that has entered at the predetermined incident angle.

(3) Second Example of the First Embodiment (an Example of a Composite Diffraction Element Having Two Sets of Structures in Each of which Three Diffraction Elements are Stacked)

FIG. 5 shows a schematic diagram of a composite diffraction element of a reference example for easier understanding of the present technology. FIG. 5(a) is a diagram for explaining how light travels in the composite diffraction element, and, for convenience of explanation, the four diffraction element layers constituting the composite diffraction element are separated from one another. FIG. 5(b) shows the four diffraction element layers that are stacked.

FIG. 6 shows a schematic diagram of an example of a composite diffraction element according to the present technology. FIG. 6(a) is a diagram for explaining how light travels in the composite diffraction element, like FIG. 5(a). FIG. 6(b) shows six diffraction element layers that are stacked.

In the description below, a composite diffraction element according to the present technology is explained with reference to FIGS. 5 and 6.

(3-1) Composite Diffraction Element of a Reference Example

A composite diffraction element 200 shown in FIGS. 5(a) and 5(b) includes a first combination 210 formed with a first diffraction element 201 and a second diffraction element 202, and a second combination 220 formed with a first diffraction element 204 and a second diffraction element 205. These four diffraction elements are stacked as shown in FIG. 5(b). As shown in FIGS. 5(a) and 5(b), the composite diffraction element 200 diffracts light L21 that has reached the composite diffraction element 200 from the upper side of the paper surface, and causes light L29 to travel toward the lower side of the paper surface. The light L21 is image display light or the like, for example, but is not limited to this. The composite diffraction element 200 has substantially the same diffraction function as a transmissive diffraction function that transmissively diffracts the light L21 to obtain the light L29.

In the description below, how the light indicated by a solid line in FIG. 5(a) travels (how the target light travels) is first explained, followed by explanation of how the light indicated by a dashed line travels (how the unnecessary zeroth-order light travels).

(How the Target Light Travels)

The first diffraction element 201 transmits the light L21. The light L21 that has passed through the first diffraction element 201 reaches the second diffraction element 202.

The second diffraction element 202 diffractively reflects the light L21 that has passed through the first diffraction element 201, toward the first diffraction element 201. The diffractively reflected light L22 travels toward the first diffraction element 201.

The first diffraction element 201 diffractively reflects the diffractively reflected light L22. The diffractively reflected light L25 travels toward the second diffraction element 202.

The second diffraction element 202 transmits the light L25 diffractively reflected by the first diffraction element 201.

The light L25 that has passed through the second diffraction element 202 reaches the first diffraction element 204 forming the combination 220.

The first diffraction element 204 forming the combination 220 transmits the transmitted light L25. The transmitted light L25 reaches the second diffraction element 205.

The second diffraction element 205 forming the combination 220 diffractively reflects the transmitted light L25 toward the first diffraction element 204. The diffractively reflected light 26 travels toward the first diffraction element 204.

The first diffraction element 204 diffractively reflects the diffractively reflected light L26. The diffractively reflected light L29 travels toward the second diffraction element 205.

The second diffraction element 205 transmits the light L29 diffractively reflected by the first diffraction element 204. The transmitted light L29 can be used as desired light, or as image display light, for example, and can be used for image presentation by a Maxwell view, for example.

(How the Unnecessary Zeroth-Order Light Travels)

Not all the light L21 is diffractively reflected by the second diffraction element 202, and part of the light L21 might pass through the second diffraction element 202. That is, the transmitted light L23 is zeroth-order light.

Also, in the first diffraction element 201, not all the light L22 is diffractively reflected, and part of the light L22 might pass through the first diffraction element 201. That is, the transmitted light L24 is zeroth-order light.

Not all the light L25 is diffractively reflected by the second diffraction element 205, and part of the light L25 might pass through the second diffraction element 205. That is, the transmitted light L27 is zeroth-order light.

Not all the light L26 is diffractively reflected by the first diffraction element 204, and part of the light L26 might pass through the first diffraction element 204. That is, the transmitted light L28 is zeroth-order light.

As described above, the combination 210 of the first diffraction element 201 and the second diffraction element 202, and the combination 220 of the first diffraction element 204 and the second diffraction element 205 each function like a transmissive diffraction hologram. Further, the entire composite diffraction element 200 in which these two combinations are stacked also has a diffraction function similar to that of a transmissive diffraction hologram. However, the light L23 and the light L27, which are zeroth-order light, also travel on the lower side of the paper surface on which the diffractively reflected light L29 travels. Therefore, the light L23 and the light L27 might affect the use of the light L29. For example, the light L23 and the light L27 might have an undesired effect on image display with the light L29.

(3-2) Composite Diffraction Element According to the Present Technology

As shown in FIG. 6, a composite diffraction element 250 according to the present technology includes a first combination 260 including a third diffraction element 203 in addition to the first diffraction element 201 and the second diffraction element 202, and a second combination 270 including a third diffraction element 206 in addition to the first diffraction element 204 and the second diffraction element 205. These diffraction elements 201 to 206 are stacked in this order, as shown in FIGS. 6(a) and 6(b). Like the composite diffraction element 200 shown in FIG. 5, the composite diffraction element 250 diffracts light L21 that has reached the composite diffraction element 250 from the upper side of the paper surface, and causes light L29 to travel toward the lower side of the paper surface. The light L21 is image display light or the like, for example, but is not limited to this. The composite diffraction element 250 has substantially the same diffraction function as a transmissive diffraction function that transmissively diffracts the light L21 to obtain the light L29.

In the description below, how the light indicated by a solid line in FIG. 6(a) travels (how the target light travels) is first explained, followed by explanation of how the light indicated by a dashed line travels (how the unnecessary zeroth-order light travels).

(How the Target Light Travels)

The first diffraction element 201 transmits the light L21. The light L21 that has passed through the first diffraction element 201 reaches the second diffraction element 202.

The second diffraction element 202 diffractively reflects the light L21 that has passed through the first diffraction element 201, toward the first diffraction element 201. The diffractively reflected light L22 travels toward the first diffraction element 201.

The first diffraction element 201 diffractively reflects the diffractively reflected light L22 toward the second diffraction element 202. The diffractively reflected light L25 travels toward the second diffraction element 202.

The second diffraction element 202 transmits the light L25 diffractively reflected by the first diffraction element 201. The transmitted light L25 reaches the third diffraction element 203.

The third diffraction element 203 transmits the light L25 transmitted by the second diffraction element 202. The light L25 that has passed through the third diffraction element 203 reaches the first diffraction element 204 forming the second combination 270.

The first diffraction element 204 transmits the light L25. The light L25 that has passed through the first diffraction element 204 reaches the second diffraction element 205.

The second diffraction element 205 diffractively reflects the light L25 that has passed through the first diffraction element 204, toward the first diffraction element 204. The diffractively reflected light L26 travels toward the first diffraction element 204.

The first diffraction element 204 diffractively reflects the diffractively reflected light L26 toward the second diffraction element 205. The diffractively reflected light L29 travels toward the second diffraction element 205.

The second diffraction element 205 transmits the light L29 diffractively reflected by the first diffraction element 204. The transmitted light L29 reaches the third diffraction element 206.

The third diffraction element 206 transmits the light L29 transmitted by the second diffraction element 205. The light L29 that has passed through the third diffraction element 206 can be used as desired light, or as image display light, for example, and can be used for image presentation by a Maxwell view, for example.

(How the Unnecessary Zeroth-Order Light Travels)

Not all the light L21 is diffractively reflected by the second diffraction element 202, and part of the light L21 might pass through the second diffraction element 202. That is, the transmitted light L23 is zeroth-order light. The transmitted zeroth-order light L23 travels to the third diffraction element 203.

The third diffraction element 203 diffractively reflects the zeroth-order light L23. The light L30 diffractively reflected by the third diffraction element 203 travels toward the second diffraction element 202.

The second diffraction element 202 transmits the light L30. The light L30 that has passed through the second diffraction element 202 further travels toward the first diffraction element 201.

Further, the first diffraction element 201 transmits the light L30 that has passed through the second diffraction element 202.

Not all the light L22 is diffractively reflected by the first diffraction element 201, and part of the light L22 might pass through the first diffraction element 201. That is, the transmitted light L24 is zeroth-order light.

Not all the light L25 is diffractively reflected by the second diffraction element 205, and part of the light L25 might pass through the second diffraction element 205. That is, the transmitted light L27 is zeroth-order light. The transmitted zeroth-order light L27 travels to the third diffraction element 206.

The third diffraction element 206 diffractively reflects the zeroth-order light L27. The light L31 diffractively reflected by the third diffraction element 206 travels toward the second diffraction element 205.

The second diffraction element 205 transmits the light L31. The light L31 that has passed through the second diffraction element 205 further travels toward the first diffraction element 204.

Further, the first diffraction element 204 and all the diffraction elements 203, 202, and 201 constituting the first combination 260 each transmit the light L31 that has passed through the second diffraction element 205.

Not all the light L26 is diffractively reflected by the first diffraction element 204, and part of the light L26 might pass through the first diffraction element 204. That is, the transmitted light L28 is zeroth-order light.

Further, all the diffraction elements 203, 202, and 201 constituting the first combination 260 each transmit the light L28 that has passed through the first diffraction element 204.

As described above, the third diffraction element 203 forming the first combination 260 causes the zeroth-order light L23 to travel to the upper side of the paper surface of FIG. 6, instead of to the lower side of the paper surface of FIG. 6. Thus, the zeroth-order light L23 can be prevented from affecting the light L29, and the quality of the light L29 can be increased.

Further, the third diffraction element 206 forming the second combination 270 causes the zeroth-order light L27 to travel to the upper side of the paper surface of FIG. 6, instead of to the lower side of the paper surface of FIG. 6. Thus, the zeroth-order light L27 can be prevented from affecting the light L29, and the quality of the light L29 can be increased.

Note that, in a case where the composite diffraction element described above includes the transparent plate described above, the transparent plate may be inserted between the first diffraction element 201 and the second diffraction element 202, between the second diffraction element 202 and the third diffraction element 203, between the third diffraction element 203 and the first diffraction element 204, between the first diffraction element 204 and the second diffraction element 205, or between the second diffraction element 205 and the third diffraction element 206. Alternatively, all the six layers may be stacked on one of the surfaces of the transparent plate.

Further, in a case where any of these diffraction elements 201 to 206 is a stack of a plurality of diffraction element layers described below in (4), the transparent plate may be inserted between the plurality of diffraction element layers.

(3-3) Examples of Angle Design for a Composite Diffraction Element According to the Present Technology Examples of angle design (examples of optical path design) for incident light and reflected light regarding each of the diffraction elements constituting the composite diffraction element 250 described above with reference to FIG. 6 are now described, with reference to FIGS. 7A and 7B. FIG. 7A shows six examples of angle design. FIG. 7B is a diagram for explaining Example 21 of the six examples of angle design.

The angles shown in FIG. 7A are described below.

"In-Out angle margin" is the difference between the incident angle (In) of the light L25 entering the second diffraction element 205 and the maximum value of the exit angle (Out) of the light L29 that is diffractively reflected and condensed by the first diffraction element 204.

"Connection angle shift amount" is the difference between the incident angle of the light L25 that is entering the second diffraction element 205 and is to be diffractively reflected by the second diffraction element 205, and the exit angle of the light L26 diffractively reflected by the second diffraction element 205. The connection angle shift amount may be 0° (which means that there is no connection angle shift amount), for example, but is preferably more than 0°, more preferably 1° or greater, or even more preferably 3° or greater. The connection angle shift amount can be 10° or smaller, for example, or preferably 8° or smaller. As the diffraction performance of the second diffraction element 205 is designed to have the connection angle shift amount, reflected light of the light L25 at the second diffraction element 205 can be distinguished from diffractively reflected light of the light L25 at the second diffraction element 205.

The "incident angle" of the "second diffraction element" in the "first combination" is the incident angle of the light L21 that is entering the second diffraction element 202 and is to be diffractively reflected by the second diffraction element 202.

The "exit angle" of the "second diffraction element" in the "first combination" is the exit angle of the light L22 diffractively reflected by the second diffraction element 202, with respect to the second diffraction element 202.

The "incident angle" of the "first diffraction element" in the "first combination" is the incident angle of the light L22 that is entering the first diffraction element 201 and is to be diffractively reflected by the first diffraction element 201. The "incident angle" of the "first diffraction element" may be equal to the "exit angle" of the "second diffraction element".

The "exit angle" of the "first diffraction element" in the "first combination" is the exit angle of the light L25 diffractively reflected by the first diffraction element 201.

The "incident angle" of the "third diffraction element" in the "first combination" is the incident angle of the zeroth-order light L23 that has passed through the second diffraction element 202 and is entering the third diffraction element 203.

The "exit angle" of the "third diffraction element" in the "first combination" is the minimum value of the exit angle of the light L30 diffractively reflected by the third diffraction element 203, with respect to the third diffraction element 203. That is, the diffraction performance of the third diffraction element 203 may be preferably designed to diffractively reflect the light L23 at an exit angle equal to or greater than the minimum value. Thus, it is possible to more reliably prevent the light L23 from being reflected or diffractively reflected by the second diffraction element 202 or the first diffraction element 201, and traveling in the traveling direction of the light L29.

The "incident angle" of the "second diffraction element" in the "second combination" is the incident angle of the light L25 that is entering the second diffraction element 205 and is to be diffractively reflected by the second diffraction element 205.

The "exit angle" of the "second diffraction element" in the "second combination" is the exit angle of the light L26 diffractively reflected by the second diffraction element 205, with respect to the second diffraction element 205. The "exit angle" of the "second diffraction element" is greater than the "incident angle" of the "second diffraction element" by the connection angle shift amount.

The "incident angle" of the "first diffraction element" in the "second combination" is the incident angle of the light L26 that is entering the first diffraction element 204 and is to be diffractively reflected by the first diffraction element 204. The "incident angle" of the "first diffraction element" may be equal to the "exit angle" of the "second diffraction element".

The "effective range" of the "first diffraction element" in the "second combination" is the maximum value range of the exit angle of the light L26 that is diffractively reflected and condensed by the first diffraction element 204. For example, in Example 1, "±25" is shown, which means that the range of the exit angle of the light L29 that is diffractively reflected and condensed by the first diffraction element 204 is from −25° to +250.

The "incident angle" of the "third diffraction element" in the "second combination" is the incident angle of the zeroth-order light L27 that has passed through the second diffraction element 205 and is entering the third diffraction element 206. The "incident angle" of the "third diffraction element" may be equal to the "incident angle" of the "second diffraction element".

The "exit angle" of the "third diffraction element" in the "second combination" is the minimum value of the exit angle of the light L31 diffractively reflected by the third diffraction element 206, with respect to the third diffraction element 206. That is, the diffraction performance of the third diffraction element 206 may be preferably designed to diffractively reflect the light L27 at an exit angle equal to or greater than the minimum value. Thus, it is possible to more reliably prevent the light L31 from being reflected or diffractively reflected by the other diffraction elements 201 to 205, and traveling to the lower side of the paper surface in the traveling direction of the light L29.

How to design the angles of incident light and reflected light with respect to each diffraction element is now described, with reference to Example 21 of the six examples of angle design shown in FIG. 7A, and to FIG. 7B.

(How Light Travels in the First Combination)

In Example 21 of the examples of angle design, the second diffraction element 202 diffractively reflects, at an exit angle of 30°, the light L21 that has entered at an incident angle of 0°. The light L22 diffractively reflected by the second diffraction element 202 travels to the first diffraction element 201, and enters the first diffraction element 201 at an incident angle of 30°.

Note that the first diffraction element 201 transmits the light L21 that has entered at an incident angle of 0°.

The first diffraction element 201 diffractively reflects, at an exit angle of 35°, the light L22 that has entered at an incident angle of 30°.

The second diffraction element 202 and the third diffraction element 203 transmit the light L25 that has entered at an incident angle of 35°. The transmitted light L25 further travels to the first diffraction element 204 forming the second combination 270.

The second diffraction element 202 does not diffractively reflect all of the light L21 that has entered at an incident angle of 0°, but can transmit part of the light L21 to generate zeroth-order light. The transmitted zeroth-order light L23 enters the third diffraction element 203 at an incident angle of 0°.

The third diffraction element 203 diffractively reflects the zeroth-order light L23 at an exit angle of 45° or greater on the right side of the paper surface (which is the side opposite from the direction of diffractive reflection of the light L22 by the second diffraction element 202). With this arrangement, it is possible to prevent the zeroth-order light L23 from affecting the light L29.

Further, the diffractively reflected light L30 travels toward the second diffraction element 202 and the first diffraction element 201, and enters at an incident angle of 45° or greater. Both the second diffraction element 202 and the first diffraction element 201 transmit the light L30 that has entered at an incident angle of 45° or greater. With this arrangement, it is possible to prevent the light L30 from affecting the light L29.

(How Light Travels in the Second Combination)

As described above, the light L25 that has passed through the second diffraction element 202 and the third diffraction element 203 reaches the first diffraction element 204 forming the second combination 270. The first diffraction element 204 transmits the light L25 that has entered at an incident angle of 35°. The transmitted light L25 travels toward the second diffraction element 205.

The second diffraction element 205 diffractively reflects, at an exit angle of 40°, the light L25 that has entered at an incident angle of 35°. The light L25 diffractively reflected by the second diffraction element 205 travels to the first diffraction element 204, and enters the first diffraction element 204 at an incident angle of 40°.

The first diffraction element 204 diffractively reflects the light L26 that has entered at an incident angle of 40°, at an exit angle within the effective range of −25° to +25°. As shown in FIG. 6, the light L26 is diffractively reflected so as to be condensed.

The second diffraction element 205 and the third diffraction element 206 transmit the light L29 diffractively reflected at an exit angle within the effective range for the first diffraction element 204.

The second diffraction element 205 does not diffractively reflect all of the light L25 that has entered at an incident angle of 35°, but can transmit part of the light L25 to generate zeroth-order light. The transmitted zeroth-order light L27 enters the third diffraction element 206 at an incident angle of 35°.

The third diffraction element 206 diffractively reflects the zeroth-order light L27 at an exit angle of 50° or greater. With this arrangement, it is possible to prevent the zeroth-order light L27 from affecting the light L29.

Further, the diffractively reflected light L31 travels toward the second diffraction element 205 and the first diffraction element 204, and enters at an incident angle of 50° or greater. Both the second diffraction element 205 and the first diffraction element 204 transmit the light L31 that has entered at an incident angle of 50° or greater. Further, the three diffraction elements constituting the first combination also transmit the incident light L31 that has entered at an incident angle of 50° or greater. With this arrangement, it is possible to prevent the light L31 from affecting the light L29.

The effects of the present technology can be achieved with the above angle design. Also, in Examples 22 to 26, the effects of the present technology can be achieved as in Example 1.

(3-4) Composite Diffraction Element According to the Present Technology

In the composite diffraction element 250 described above with reference to FIG. 6, the third diffraction element 203 of the first combination 260 diffractively reflects zeroth-order light at a predetermined exit angle on the right side of the paper surface (which is the opposite side from the direction of diffractive reflection of the light L22 by the second diffraction element 202).

In the present technology, the third diffraction element 203 of the first combination 260 may be designed to reflect zeroth-order light to the opposite side, as shown in FIG. 21.

The third diffraction element 203 designed in this manner also causes the zeroth-order light L23 to the upper side of the paper surface of FIG. 21, instead of to the lower side of the paper surface of FIG. 21. Thus, the zeroth-order light L23 can be prevented from affecting the light L29, and the quality of the light L29 can be increased.

Note that the contents described above in (3-2) apply to the other diffraction elements shown in FIG. 21.

(3-5) Other Examples of Angle Design for a Composite Diffraction Element According to the Present Technology Other examples of angle design (examples of optical path design) for incident light and reflected light regarding each of the diffraction elements constituting the composite diffraction element 250 described above with reference to FIG. 21 are now described, with reference to FIGS. 22A and 22B. FIG. 22A shows six examples of angle design. FIG. 22B is a diagram for explaining Example 27 of the six examples of angle design.

The respective items in the table shown in FIG. 22A are the same as those described above in (3-3) regarding FIG. 7A, and the explanation of them also applies in this example.

How to design the angles of incident light and reflected light with respect to each diffraction element is now described, with reference to Example 27 of the six examples of angle design shown in FIG. 22A, and to FIG. 22B.

(How Light Travels in the First Combination)

In Example 27 of the examples of angle design, the second diffraction element 202 diffractively reflects, at an exit angle of 30°, the light L21 that has entered at an incident angle of 0°. The light L22 diffractively reflected by the second diffraction element 202 travels to the first diffraction element 201, and enters the first diffraction element 201 at an incident angle of 30°.

Note that the first diffraction element 201 transmits the light L21 that has entered at an incident angle of 0°.

The first diffraction element 201 diffractively reflects, at an exit angle of 35°, the light L22 that has entered at an incident angle of 30°.

The second diffraction element 202 and the third diffraction element 203 transmit the light L25 that has entered at an incident angle of 35°. The transmitted light L25 further travels to the first diffraction element 204 forming the second combination 270.

The second diffraction element 202 does not diffractively reflect all of the light L21 that has entered at an incident angle of 0°, but can transmit part of the light L21 to generate zeroth-order light. The transmitted zeroth-order light L23 enters the third diffraction element 203 at an incident angle of 0°.

The third diffraction element 203 diffractively reflects the zeroth-order light L23 at an exit angle of 40° or greater on the left side of the paper surface (which is the same side as the direction of diffractive reflection of the light L22 by the second diffraction element 202). With this arrangement, it is possible to prevent the zeroth-order light L23 from affecting the light L29.

Further, the diffractively reflected light L30 travels toward the second diffraction element 202 and the first diffraction element 201, and enters at an incident angle of 40° or greater. Both the second diffraction element 202 and the first diffraction element 201 transmit the light L30 that has entered at an incident angle of 40° or greater. With this arrangement, it is possible to prevent the light L30 from affecting the light L29.

(How Light Travels in the Second Combination)

As described above, the light L25 that has passed through the second diffraction element 202 and the third diffraction element 203 reaches the first diffraction element 204 forming the second combination 270. The first diffraction element 204 transmits the light L25 that has entered at an incident angle of 35°. The transmitted light L25 travels toward the second diffraction element 205.

The second diffraction element 205 diffractively reflects, at an exit angle of 50°, the light L25 that has entered at an incident angle of 35°. The light L25 diffractively reflected by the second diffraction element 205 travels to the first diffraction element 204, and enters the first diffraction element 204 at an incident angle of 50°.

The first diffraction element 204 diffractively reflects the light L26 that has entered at an incident angle of 50°, at an exit angle within the effective range of −25° to +25°. As shown in FIG. 21, the light L26 is diffractively reflected so as to be condensed.

The second diffraction element 205 and the third diffraction element 206 transmit the light L29 diffractively reflected at an exit angle within the effective range for the first diffraction element 204.

The second diffraction element 205 does not diffractively reflect all of the light L25 that has entered at an incident angle of 35°, but can transmit part of the light L25 to generate zeroth-order light. The transmitted zeroth-order light L27 enters the third diffraction element 206 at an incident angle of 35°.

The third diffraction element 206 diffractively reflects the zeroth-order light L27 at an exit angle of 60° or greater. With this arrangement, it is possible to prevent the zeroth-order light L27 from affecting the light L29.

Further, the diffractively reflected light L31 travels toward the second diffraction element 205 and the first diffraction element 204, and enters at an incident angle of 60° or greater. Both the second diffraction element 205 and the first diffraction element 204 transmit the light L31 that has entered at an incident angle of 60° or greater. Further, the three diffraction elements constituting the first combination also transmit the incident light L31 that has entered at an incident angle of 60° or greater. With this arrangement, it is possible to prevent the light L31 from affecting the light L29.

The effects of the present technology can be achieved with the above angle design. Also, in Examples 28 to 32, the effects of the present technology can be achieved as in Example 27.

(4) Third Example of the First Embodiment (an Example of a Color-Compatible Composite Diffraction Element)

(4-1) Description of a Color-Compatible Composite Diffraction Element

A composite diffraction element according to the present technology may diffract light of one wavelength, or may diffract light of a plurality of wavelengths. For example, a composite diffraction element according to the present technology may diffract light in one wavelength band, or may diffract light in a plurality of wavelength bands. The light of one wavelength and the light of a plurality of wavelengths are preferably visible light. As described above, a composite diffraction element according to the present technology may have wavelength selectivity, or can selectively diffract only light in a specific wavelength range or a plurality of wavelength ranges. A composite diffraction element of the present technology that diffracts light of a plurality of wavelengths can be used for displaying a color image, for example.

In a case where a composite diffraction element according to the present technology diffracts light of a plurality of wavelengths, the number of the plurality of wavelengths (which is the number of the plurality of wavelength bands) is two to five, or preferably two to four, or more preferably two or three, for example. In this case, all of the first diffraction element, the second diffraction element, and the third diffraction element can diffract the light of the plurality of wavelengths (which is the plurality of wavelength bands). All the plurality of wavelengths to be diffracted by the first diffraction element, the second diffraction element, and the third diffraction element can be the same. In this case, each diffraction element can be manufactured by multiple exposure.

In a particularly preferred embodiment, a composite diffraction element according to the present technology may diffract light of three colors: red (R), green (G), and blue (B). That is, the composite diffraction element diffracts light in three wavelength bands. The wavelength band of red light may be in the range of 610 nm to 750 nm, or preferably 620 nm to 700 nm, for example. The wavelength band of green light may be in the range of 490 nm to 560 nm, or preferably 500 nm to 550 nm, for example. The wavelength band of blue light may be in the range of 420 nm to 490 nm, or preferably 430 nm to 480 nm, for example.

According to one embodiment of the present technology, all of the first diffraction element, the second diffraction element, and the third diffraction element can be single-layer diffraction elements, or particularly, single-layer reflective holograms. All of the single-layer first diffraction element, the single-layer second diffraction element, and the single-layer third diffraction element may diffract light of a plurality of wavelengths. The light of a plurality of wavelengths to be diffracted by these three diffraction elements is preferably the same. That is, the wavelength bands of the light of a plurality of wavelengths that can be diffracted by these three diffraction elements are preferably the same. The light of a plurality of wavelengths can be light of the three colors of R, G, and B, for example, as described above.

In this embodiment, the three diffraction elements can be manufactured by a method known in the art, and can be manufactured by multiple exposure using light of R, G, and B, for example.

According to another embodiment of the present technology, at least one of the first diffraction element, the second diffraction element, and the third diffraction element can be a stack of a plurality of diffraction element layers. The stack of a plurality of diffraction element layers preferably has a different wavelength selectivity.

In the single-layer diffraction elements manufactured by multiple exposure using the light of R, G, and B described above, diffraction efficiency is distributed by R, G, and B. Therefore, the proportion of light to be diffractively reflected is low, and the amount of zeroth-order light (light that has not been diffracted and has been transmitted) can be large. In view of this, each diffraction element is formed with a stack of a plurality of diffraction element layers as described above, so that the proportion of light to be diffractively reflected can be increased.

This embodiment is described below, with reference to FIG. 8.

FIG. 8A corresponds to FIG. 3(a) described above. In FIG. 8A, a first diffraction element 301, a second diffraction element 302, and a third diffraction element 303 are each formed with a single-layer reflective hologram that selectively diffracts light of the three colors of R, G, and B.

Of these three diffraction elements, any one or two, or all three may be a stack of a plurality of diffraction element layers. The stack may be a stack of a diffraction element layer that diffracts red light, a diffraction element layer that diffracts blue light, and a diffraction element layer that diffracts green light, for example.

FIG. 8B is an example of a composite diffraction element in which each of these three diffraction elements is a stack of a plurality of diffraction element layers. FIG. 8C is an example of a composite diffraction element in which, of these three diffraction elements, the first diffraction element 301 is a single-layer diffraction element layer, and the second diffraction element 302 and the third diffraction element 303 are stacks of a plurality of diffraction element layers.

As a stack of a plurality of diffraction element layers is used as the first, second, or third diffraction element in this manner, diffraction efficiency can be increased.

Further, it is possible to manufacture a stack of a plurality of diffraction element layers by forming three diffraction element layers having different wavelength selectivities through exposure to light of R, G, and B, and stacking the three diffraction element layers. The three diffraction element layers can be exposed so as to have the same diffraction angle.

Figure 8:
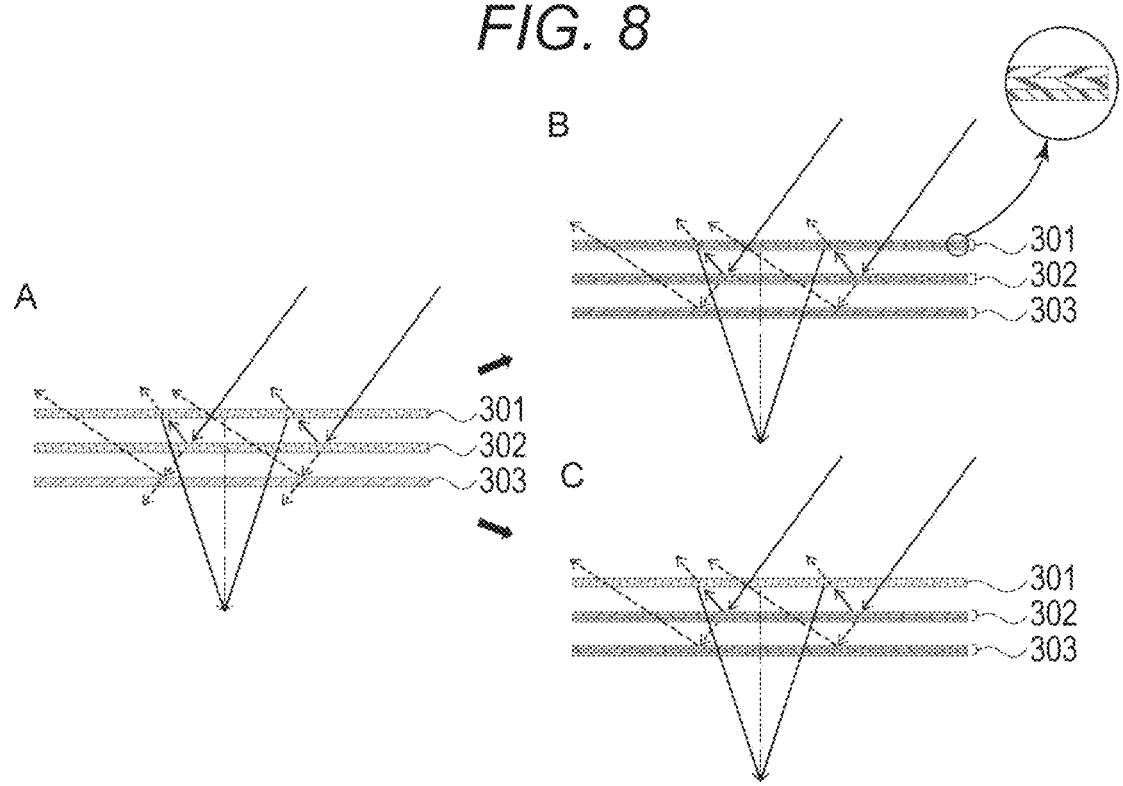
FIG. 8 is a schematic diagram of an example of a composite diffraction element according to the present technology.

Note that the first diffraction element 301 in FIG. 8 has a lens function, for example. In a diffraction element having a lens function, interference fringes are distributed two-dimensionally. To manufacture a diffraction element having a lens function by stacking a plurality of diffraction element layers, the plurality of diffraction element layers needs to be two-dimensionally overlapped on one another with high precision. Meanwhile, the second diffraction element 302 and the third diffraction element 303 do not need to have a lens function. To manufacture the second diffraction element 302 and the third diffraction element 303 by stacking a plurality of diffraction element layers, only the parallelism of the interference fringes of the plurality of diffraction element layers needs to be the same, and these diffraction elements can be manufactured more easily than a diffraction element having a lens function. Accordingly, the composite diffraction element shown in FIG. 8C can be manufactured more easily than the composite diffraction element shown in FIG. 8B. Further, in the composite diffraction element shown in FIG. 8C, the diffractive reflectance can be increased by the second and third diffraction elements, and thus, both readiness of manufacture and optical performance can be achieved at the same time.

As described above, in a composite diffraction element according to the present technology, the first diffraction element is preferably a single layer, and both the second diffraction element and the third diffraction element are preferably a stack of a plurality of diffraction element layers.

(4-2) Estimates of Diffraction Efficiencies and Zeroth-Order Light Reduction Effects The diffraction efficiencies of the composite diffraction elements shown in FIGS. 2 and 3, and the zeroth-order light reduction effect of a third diffraction element will be described below in (4-2-1), with reference to the calculation results shown in Table 2.

The diffraction efficiencies of the composite diffraction elements shown in FIGS. 5 and 6, and the zeroth-order light reduction effect of a third diffraction element will be described below in (4-2-2), with reference to the calculation results shown in Table 3.

Note that, in these calculations, the diffraction efficiencies of the first diffraction element, the second diffraction element, and the third diffraction element were assumed as shown below in Table 1.

TABLE 1

| Assumed diffraction efficiencies | | | |
|---|---|---|---|
| | Single-layer and single-color exposure | Single-layer and RGB multiple exposure | Three-layer stack (R layer/G layer/B layer) |
| Material 1 (low diffraction rate) | 60% | 20% | 60% |
| Material 2 (high diffraction rate) | 90% | 30% | 90% |

It was assumed that each composite diffraction element was manufactured with one of the material groups: Material 1 (low diffraction rate) or Material 2 (high diffraction rate) shown in Table 1. Of the material group of Material 1, the diffraction efficiency of a single-layer diffraction element subjected to single-color exposure was assumed to be 60%, the diffraction efficiency of a single-layer diffraction element subjected to RGB multiple exposure was assumed to be 20%, and the diffraction efficiency of each layer in a three-layer stack formed with three diffraction element layers exposed to light of the colors R, G, and B was assumed to be 60%. As shown in Table 1, the diffraction efficiency of the single-layer diffraction element subjected to RGB multiple exposure is assumed to be lower than that of the three-layer stack as described above. Further, it is considered that the three-layer stack can achieve a diffraction efficiency similar to that of the single-layer diffraction element subjected to single-color exposure, and accordingly, the diffraction efficiencies of these elements are set at the same value.

As for the material group of Material 2, higher diffraction efficiencies than those of Material 1 are set, as shown in Table 1.

(4-2-1) Comparison Between the Composite Diffraction Elements Shown in FIGS. 2 and 3

Examples 3-1 to 3-6 in Table 2-1 shown below indicate the diffraction efficiencies and the proportions of the zeroth-order light L3 in the composite diffraction element that was manufactured with the material group of Material 1 or Material 2 and is shown in FIG. 2. In Table 2-1, "In-Out diffraction efficiency" is the diffraction efficiency of the composite diffraction element, which is the ratio of the amount of the outgoing light L5 to the amount of the incident light L1. In this table, "proportion of stray light to Out side" is the ratio of the amount of the zeroth-order light L3 to the amount of the incident light L1.

[Table 2]

Table 2: Estimates of Diffraction Efficiencies and Zeroth-Order Light Reduction Effects

TABLE 2-1

Case where third diffraction element is not included (case of composite diffraction element in FIG. 2)

| | Material 1 (low diffraction rate) | | | Material 2 (high diffraction rate) | | |
| --- | --- | --- | --- | --- | --- | --- |
| | Example 3-1 | Example 3-2 | Example 3-3 | Example 3-4 | Example 3-5 | Example 3-6 |
| Single-color/multicolor | single-color | multicolor | multicolor | single-color | multicolor | multicolor |
| Type of second diffraction element | single-layer | three-layer stack | three-layer stack | single-layer | three-layer stack | three-layer stack |
| Type of first diffraction element | single-layer | single-layer | three-layer stack | single-layer | single-layer | three-layer stack |
| Diffraction efficiency of second diffraction element | 60% | 60% | 60% | 90% | 90% | 90% |
| Diffraction efficiency of first diffraction element | 60% | 20% | 60% | 90% | 30% | 90% |
| In-Out diffraction efficiency | 36.0% | 12.0% | 36.0% | 81.0% | 27.0% | 81.0% |
| Proportion of stray light to Out side | 40.0% | 40.0% | 40.0% | 10.0% | 10.0% | 10.0% |

TABLE 2-2

Case where third diffraction element is included (case of composite diffraction element in FIG. 3)

| | Material 1 (low diffraction rate) | | | Material 2 (high diffraction rate) | | |
| --- | --- | --- | --- | --- | --- | --- |
| | Example 4-1 | Example 4-2 | Example 4-3 | Example 4-4 | Example 4-5 | Example 4-6 |
| Single-color/multicolor | single-color | multicolor | multicolor | single-color | multicolor | multicolor |
| Type of second and third diffraction elements | single-layer | three-layer stack | three-layer stack | single-layer | three-layer stack | three-layer stack |
| Type of first diffraction element | single-layer | single-layer | three-layer stack | single-layer | single-layer | three-layer stack |
| Diffraction efficiency of second diffraction element | 60% | 60% | 60% | 90% | 90% | 90% |
| Diffraction efficiency of first diffraction element | 60% | 20% | 60% | 90% | 30% | 90% |
| Diffraction efficiency of third diffraction element | 60% | 60% | 60% | 90% | 90% | 90% |
| In-Out diffraction efficiency | 36.0% | 12.0% | 36.0% | 81.0% | 27.0% | 81.0% |
| Proportion of stray light to Out side | 16.0% | 16.0% | 16.0% | 1.0% | 1.0% | 1.0% |

Example 3-1 is now described.

Since a composite diffraction element of Example 3-1 is a single-color composite diffraction element and is manufactured from Material 1. Accordingly, the diffraction efficiencies of the first and second diffraction elements constituting the composite diffraction element are both 60%, as shown in Table 1. As described above in "(2-1) Composite diffraction element of a reference example", in the composite diffraction element shown in FIG. 2, the incident light L1 is diffracted twice in total, once by the second diffraction element and once by the first diffraction element, and then turns into the outgoing light L5. Accordingly, the diffraction efficiency of the composite diffraction element of Example 3-1 is 60%×60%=36%.

Also, as described above in "(2-1) Composite diffraction element of a reference example", in the composite diffraction element shown in FIG. 2, part of the incident light L1 passes through the second diffraction element, and the transmitted zeroth-order light L3 travels to the lower side of the paper surface of FIG. 2. The ratio of the amount of the zeroth-order light L3 to the amount of the incident light L1 is 100%−60%=40%.

Likewise, in Examples 3-2 to 3-6, the diffraction efficiencies and the proportions of the zeroth-order light were calculated, and are shown in Table 2-1.

Examples 4-1 to 4-6 in Table 2-2 shown above indicate the diffraction efficiencies and the proportions of the zeroth-order light L3 in the composite diffraction element that was manufactured with the material group of Material 1 or Material 2 and is shown in FIG. 3. In Table 2-2, "In-Out diffraction efficiency" is the diffraction efficiency of the composite diffraction element, which is the ratio of the amount of the outgoing light L5 to the amount of the incident light L1. In this table, "proportion of stray light to Out side" is the ratio of the amount of light that has passed through the third diffraction element and traveled to the lower side of the paper surface of FIG. 3 in the zeroth-order light L3, with respect to the incident light L1.

Example 4-1 is now described.

Since a composite diffraction element of Example 4-1 is a single-color composite diffraction element and is manufactured from Material 1. Accordingly, the diffraction efficiencies of the first and second diffraction elements constituting the composite diffraction element are both 60%, as shown in Table 1. As described above in "(2-2) Composite diffraction element according to the present technology", in the composite diffraction element shown in FIG. 3, the incident light L1 is diffracted twice in total, once by the second diffraction element and once by the first diffraction element, and then turns into the outgoing light L5. Accordingly, the diffraction efficiency of the composite diffraction element of Example 3-1 is 60%×60%=36%.

Also, as described above in "(2-2) Composite diffraction element according to the present technology", in the composite diffraction element shown in FIG. 3, part of the incident light L1 passes through the second diffraction element and turns into the zeroth-order light L3. The zeroth-order light L3 is diffractively reflected by the third diffraction element. However, depending on the diffraction efficiency of the third diffraction element, part of the zeroth-order light L3 passes through the third diffraction element, and travels to the lower side of the paper surface of FIG. 3. in the zeroth-order light L3, the ratio of the amount of light that passes through the third diffraction element to the amount of the incident light L1 is (100%−60%)×40%=16%.

Likewise, in Examples 4-2 to 4-6, the diffraction efficiencies and the proportions of the zeroth-order light were calculated, and are shown in Table 2-2.

Comparison between Example 3-1 and Example 4-1 shows that the diffraction efficiencies are the same, but the amount of the zeroth-order light traveling to the lower side of the paper surface in Example 4-1 is lower than that in Example 3-1, because of the presence of the third diffraction element. The same applies to the other examples. As can be seen from these calculation results, the amount of zeroth-order light that can affect the outgoing light L5 of a composite diffraction element can be reduced with the third diffraction element.

Further, Examples 4-4 to 4-6 are the calculation results in a case where a material group with a high diffraction rate was used. These results show that, in this case, the amount of zeroth-order light that might affect the outgoing light L5 of the composite diffraction element can be reduced to a very small amount with the third diffraction element.

(4-2-2) Comparison Between the Composite Diffraction Elements Shown in FIGS. 5 and 6

Examples 5-1 to 5-3 in Table 3-1 shown below indicate the diffraction efficiencies and the proportions of the zeroth-order light L3 in the composite diffraction element that was manufactured with the material group of Material 1 or Material 2 and is shown in FIG. 5. In Table 3-1, "In-Out diffraction efficiency" is the diffraction efficiency of the composite diffraction element, which is the ratio of the amount of the outgoing light L29 to the amount of the incident light L21. In this table, "proportion of stray light to Out side" is the ratio of the amount of the zeroth-order light L3 to the amount of the incident light L21.

[Table 3]
Table 3: Estimates of Diffraction Efficiencies and Zeroth-Order Light Reduction Effects

TABLE 3-1

Case where third diffraction element is not included (case of composite diffraction element in FIG. 5)

|  |  | Material 2 (high diffraction rate) | | |
|---|---|---|---|---|
|  |  | Example 5-1 | Example 5-2 | Example 5-3 |
| Single-color/multicolor | | single-color | multicolor | multicolor |
| Type of diffraction elements other than below | | single-layer | three-layer stack | three-layer stack |
| Type of first diffraction element of second combination | | single-layer | single-layer | three-layer stack |
| First combination | Diffraction efficiency of second diffraction element | 90% | 90% | 90% |
|  | Diffraction efficiency of first diffraction element | 90% | 90% | 90% |

TABLE 3-1-continued

Case where third diffraction element is not included (case of composite diffraction element in FIG. 5)

|  |  | Material 2 (high diffraction rate) | | |
|---|---|---|---|---|
|  |  | Example 5-1 | Example 5-2 | Example 5-3 |
| Second combination | Diffraction efficiency of second diffraction element | 90% | 90% | 90% |
|  | Diffraction efficiency of first diffraction element | 90% | 30% | 90% |
|  | In-Out diffraction efficiency | 65.6% | 21.9% | 65.6% |
|  | Proportion of stray light to Out side | approx. 17% | approx. 18% | approx. 17% |

TABLE 3-2

Case where third diffraction element is not included (case of composite diffraction element in FIG. 6)

|  |  | Material 2 (high diffraction rate) | | |
|---|---|---|---|---|
|  |  | Example 6-1 | Example 6-2 | Example 6-3 |
|  | Single-color/multicolor | single-color | multicolor | multicolor |
|  | Type of diffraction elements other than below | single-layer | three-layer stack | three-layer stack |
|  | Type of first diffraction element of second combination | single-layer | single-layer | three-layer stack |
| First combination | Diffraction efficiency of second diffraction element | 90% | 90% | 90% |
|  | Diffraction efficiency of first diffraction element | 90% | 90% | 90% |
| Second combination | Diffraction efficiency of second diffraction element | 90% | 90% | 90% |
|  | Diffraction efficiency of first diffraction element | 90% | 30% | 90% |
| First combination | Diffraction efficiency of third diffraction element | 90% | 90% | 90% |
| Second combination | Diffraction efficiency of third diffraction element | 90% | 90% | 90% |
|  | In-Out diffraction efficiency | 65.6% | 21.9% | 65.6% |
|  | Proportion of stray light to Out side | approx. 1.7% | approx. 1.8% | approx. 1.7% |

Example 5-1 is now described.

Since a composite diffraction element of Example 5-1 is a single-color composite diffraction element and is manufactured from Material 2. Accordingly, the diffraction efficiencies of the first and second diffraction elements constituting the composite diffraction element are both 90%, as shown in Table 1. As described above in "(3-1) Composite diffraction element of a reference example", in the composite diffraction element shown in FIG. 5, the incident light L21 is diffracted four times in total by the four diffraction elements, and then turns into the outgoing light L29. Accordingly, the diffraction efficiency of the composite diffraction element of Example 5-1 is 90%×90%×90%×90%=65.6%.

Also, as described above in "(3-1) Composite diffraction element of a reference example", in the composite diffraction element shown in FIG. 5, part of the incident light L21 passes through the second diffraction element, and the transmitted zeroth-order light L23 travels to the lower side of the paper surface of FIG. 5. With the average transmittance of the diffraction element 204 being taken into account, the ratio of the amount of the zeroth-order light L23 to the amount of the incident light L21 is expressed as: (100%−90%)×(average transmittance of diffraction element 204: assumed to be 87%)=8.7%.

Here, the average transmittance of the diffraction element 204 is the value obtained in a case where only light at ±10° at the center of the lens is reflected, and the peripheral light is transmitted within the lens effective range (±25°).

Further, part of the light L25 passes through the second diffraction element 205, and the transmitted light L27 travels to the lower side of the paper surface of FIG. 5. The ratio of the amount of the zeroth-order light L27 to the amount of the incident light L21 is 90%×90%×(100%−90%)=8.1%.

With the above facts being taken into account, the amount of the zeroth-order light traveling to the lower side of the paper surface of FIG. 6 is 8.7%+8.1%≈17%.

Likewise, in Examples 5-2 and 5-3, the diffraction efficiencies and the proportions of the zeroth-order light were calculated, and are shown in Table 2-1.

Examples 6-1 to 6-3 in Table 3-2 shown above indicate the diffraction efficiencies and the proportions of the zeroth-order light L3 in the composite diffraction element that was manufactured with the material group of Material 2 and is shown in FIG. 6. In Table 3-2, "In-Out diffraction efficiency" is the diffraction efficiency of the composite diffraction element, which is the ratio of the amount of the outgoing light L29 to the amount of the incident light L21. In this table, "proportion of stray light to Out side" is the ratio of the amount of light that has passed through the third diffraction element and traveled to the lower side of the paper surface of FIG. 6 in the zeroth-order light L23, with respect to the incident light L21.

Example 6-1 is now described.

Since a composite diffraction element of Example 6-1 is a single-color composite diffraction element and is manufactured from Material 2. Accordingly, the diffraction efficiencies of the first and second diffraction elements constituting the composite diffraction element are both 90%, as shown in Table 1. As described above in "(3-2) Composite diffraction element according to the present technology", in the composite diffraction element shown in FIG. 6, the incident light L21 is diffracted four times in total by diffraction elements, and then turns into the outgoing light L29. Accordingly, the diffraction efficiency of the composite diffraction element of Example 6-1 is 90%×90%×90%×90%=65.6%.

Also, as described above in "(3-2) Composite diffraction element according to the present technology", in the composite diffraction element shown in FIG. 6, part of the incident light L21 passes through the second diffraction element and turns into the zeroth-order light L23. The zeroth-order light L23 is diffractively reflected by the third diffraction element 203. However, depending on the diffraction efficiency of the third diffraction element 203, part of the zeroth-order light L23 passes through the third diffraction element 203, and travels to the lower side of the paper surface of FIG. 6. With the transmission efficiency of the first diffraction element 204 and the diffractive reflection by the third diffraction element 206 being taken into account, the ratio of the amount of light that passes through the third diffraction element 203 and travels to the lower side of the paper surface of FIG. 6 in the zeroth-order light L23 to the incident light L21 is calculated as: (100%−90%)×(100%−90%)×(average transmittance of diffraction element 204: assumed to be about 87%)=0.87%.

Further, the zeroth-order light L27 is diffractively reflected by the third diffraction element 206, but part of the zeroth-order light L27 passes through the third diffraction element 206 and travels to the lower side of the paper surface of FIG. 6. In the zeroth-order light L27, the ratio of the amount of light that passes through the third diffraction element 206 and travels to the lower side of the paper surface of FIG. 6 to the amount of the incident light L21 is calculated as 90%×90%×(100%−90%)×(100%−90%)=0.81%.

With the above facts being taken into account, the amount of the zeroth-order light traveling to the lower side of the paper surface of FIG. 6 is 0.87%+0.81%≈1.7%.

Likewise, in Examples 6-2 and 6-3, the diffraction efficiencies and the proportions of the zeroth-order light were calculated, and are shown in Table 3-2.

Comparison between Example 5-1 and Example 6-1 shows that the diffraction efficiencies are the same, but the amount of the zeroth-order light traveling to the lower side of the paper surface in Example 6-1 is lower than that in Example 5-1, because of the presence of the third diffraction element. The same applies to the other examples. As can be seen from these calculation results, the amount of zeroth-order light that can affect the outgoing light L29 of a composite diffraction element can be reduced with the third diffraction element.

(5) Example of a Method for Manufacturing a Composite Diffraction Element According to the Present Technology Each of the first diffraction element, the second diffraction element, and the third diffraction element that constitute a composite diffraction element according to the present technology is designed to have the diffraction characteristics described above. A person skilled in the art can manufacture these diffraction elements by using a manufacturing method known in the art. In the description below, examples of an exposure optical system for manufacturing these diffraction elements are explained.

Figure 9:
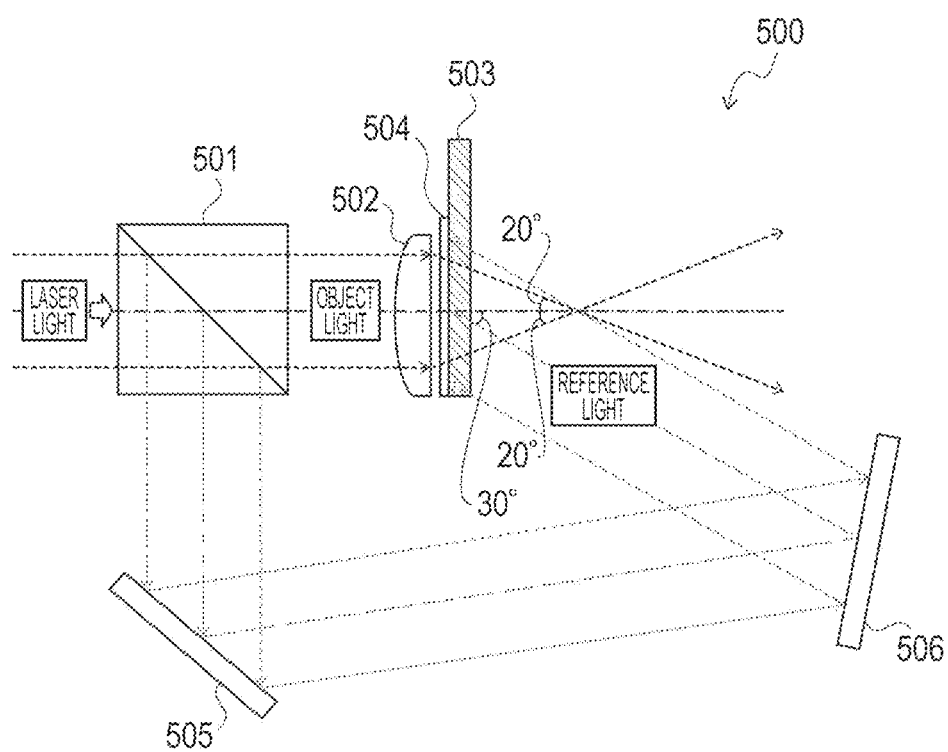
FIG. 9 is a diagram showing an example of an exposure optical system for manufacturing a first diffraction element that is a reflective hologram having a lens function.

FIG. 9 is an example of an exposure optical system for manufacturing a first diffraction element that is a reflective hologram having a lens function. The reflective hologram diffractively reflects, at an exit angle of −20° to +20°, light that has entered at an incident angle of 30°, to condense the light.

In the exposure optical system 500 shown in FIG. 9, laser light enters a beam splitter 501. The beam splitter 501 splits the laser light into reference light (a gray line) and object light (a black line). A lens 502 is disposed in the traveling direction of the object light, and the object light refracted by the lens 502 reaches a photopolymer 504 attached to a glass substrate 503 as a transparent plate. The photopolymer 504 may be a material known in the art, and may be selected as appropriate by a person skilled in the art. The lens 502 refracts the object light so that the exit angle mentioned above is formed. Meanwhile, the reference light is reflected by mirrors 505 and 506, and reaches the photopolymer 504 from the opposite side from the object light. The reference light enters the photopolymer 504 at the incident angle mentioned above. The above exposure optical system produces a reflective hologram that diffractively reflects, at an exit angle of −20° to +20°, light that enters at the incident angle mentioned above, and then condenses the light.

Figure 10:
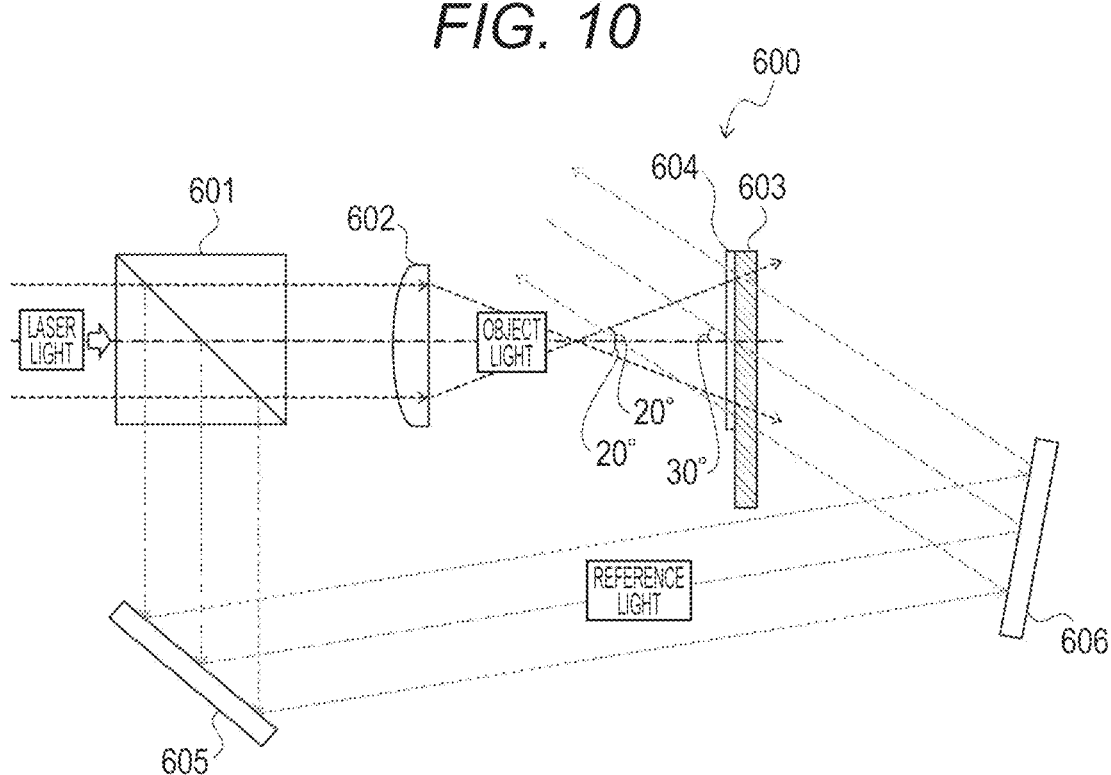
FIG. 10 is a diagram showing an example of an exposure optical system for manufacturing a first diffraction element that is a reflective hologram having a lens function.

FIG. 10 is another example of an exposure optical system for manufacturing a first diffraction element that is a reflective hologram having a lens function. The reflective hologram diffractively reflects, at an exit angle of −20° to +20°, light that has entered at an incident angle of 30°, to condense the light.

In the exposure optical system 600 shown in FIG. 10, laser light enters a beam splitter 601. The beam splitter 601 splits the laser light into reference light (a gray line) and object light (a black line). A lens 602 is disposed in the traveling direction of the object light, and the object light refracted by the lens 602 is condensed, and then reaches a photopolymer 604 attached to a glass substrate 603. The lens 602 refracts the object light so that the exit angle mentioned above is formed. Meanwhile, the reference light is reflected by mirrors 605 and 606, and reaches the photopolymer 604 from the opposite side from the object light. The reference light enters the photopolymer 604 at the incident angle mentioned above. The above exposure optical system produces a reflective hologram that diffractively reflects light that enters at the incident angle of the reference light and condenses the diffractively reflected light in the same manner as the light condensing by the lens 602.

Figure 11:
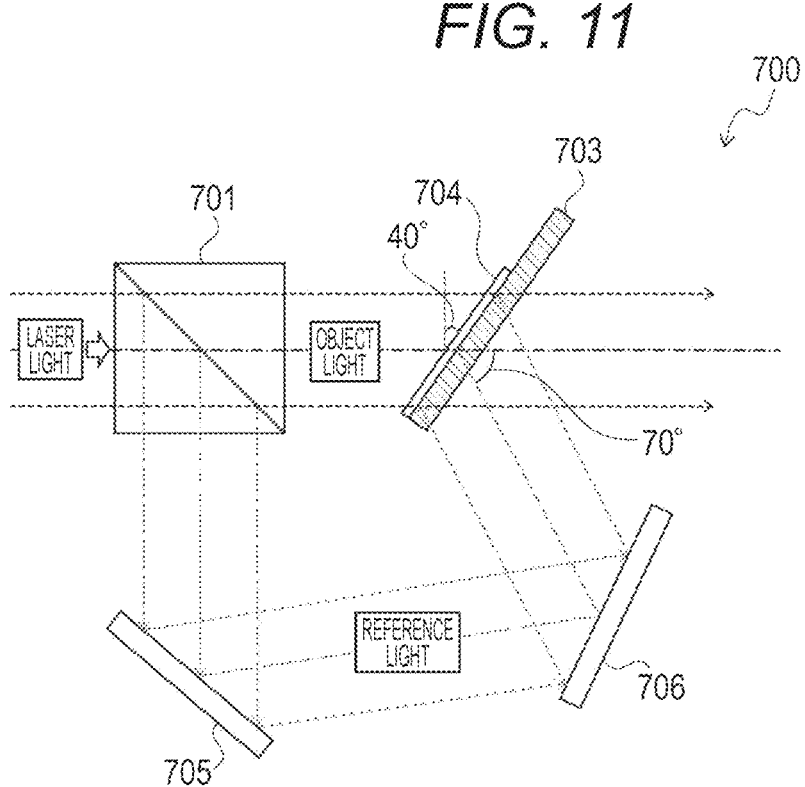
FIG. 11 is a diagram showing an example of an exposure optical system for manufacturing a second diffraction element or a third diffraction element that is a reflective hologram having a grating function.

FIG. 11 is an example of an exposure optical system for manufacturing a second diffraction element or a third diffraction element that is a reflective hologram having a grating function. The reflective hologram diffractively reflects, at an exit angle of 40°, light that has entered at an incident angle of 30°.

In the exposure optical system 700 shown in FIG. 11, laser light enters a beam splitter 701. The beam splitter 701 splits the laser light into reference light (a gray line) and object light (a black line). A photopolymer 704 attached to a glass substrate 703 is disposed in the traveling direction of the object light, and the object light passed through the photopolymer 704 at an exit angle of 40°. Meanwhile, the reference light is reflected by mirrors 705 and 706, and reaches the photopolymer 704 from the opposite side from the object light. The reference light enters the photopolymer 704 with an incident angle of 30°. The above exposure optical system produces a reflective hologram that diffractively reflects light that enters at the incident angle of the reference light.

2. Second Embodiment (Instruments)

The present technology also provides an instrument including the composite diffraction element described above in "1. First Embodiment (Composite Diffraction Element)" and a transparent plate for placing the composite diffraction element in front of the eye. The composite diffraction element is as described above in "1. First Embodiment (Composite Diffraction Element)", and the description also applies to this embodiment. The instrument facilitates holding of the composite diffraction element in front of the eye.

As described above in "(1) Description of a first embodiment" in 1., the transparent plate may be a lens of eyewear (eyeglasses, for example), an inner visor or an outer visor of a helmet, or the like, for example, but is not limited to these. That is, the instrument can be eyewear or a helmet, for example. The instrument is suitable for use in an image projection system according to the present technology, for example.

The transparent plate and the three diffraction elements constituting the composite diffraction element may be stacked as described above in "(1) Description of a first embodiment" in 1.

3. Third Embodiment (Image Projection Systems)

(1) Description of a Third Embodiment

The present technology also provides an image projection system that includes the composite diffraction element described above in "1. First Embodiment (Composite Diffraction Element)" and an image projection device that projects image display light toward the composite diffraction element. The composite diffraction element is as described above in "1. First Embodiment (Composite Diffraction Element)", and the description also applies to this embodiment. The image projection device may be separated from the composite diffraction element, for example, or more particularly, from the composite diffraction element and the instrument that holds the element in front of the eye.

The image projection system includes the composite diffraction element provided in a lens portion of glasses, and an image projection device that is separated from the glasses and projects image display light toward the composite diffraction element, for example. The composite diffraction element can diffract the image display light, and cause the image display light to reach the retina of the user of the image projection system. The composite diffraction element also transmits light from the scenery in front of the glasses, and causes the light to reach the user's retina. As a result, the image formed with the image display light appears as if floating in the scenery.

Figure 12:
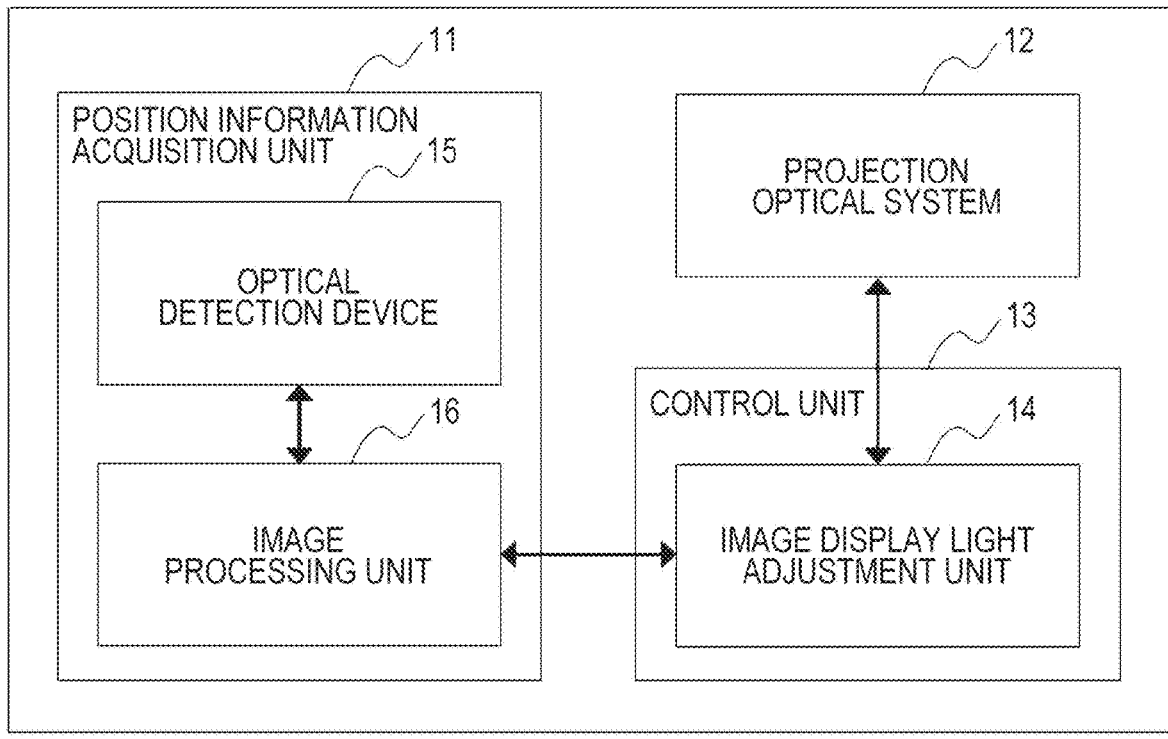
FIG. 12 is an example block diagram of an image projection device forming an image projection system according to the present technology.

An example of the image projection system according to the present technology is the image projection system 1 shown in FIG. 1 and described above in "(1) Description of a first embodiment" in 1. In the description below, the image projection system 1 is described in detail, with reference to FIGS. 1 and 12. FIG. 12 is an example block diagram of the image projection device 10 forming the image projection system 1.

As shown in FIG. 1, the image projection device 10 includes a position information acquisition unit 11, a projection optical system 12, and a control unit 13. The control unit 13 includes an image display light adjustment unit 14. As shown in FIG. 12, a composite diffraction element 20 according to the present technology is disposed in front of both eyes of the user who is using the image projection system 1. The composite diffraction element 20 is disposed in front of both eyes of the user by an instrument 21. The instrument 21 is glasses worn on the head portion of the user, for example. The image projection device 10 projects image display light toward the composite diffraction element 20, and the composite diffraction element 20 diffracts the image display light, so that the image display light reaches the user's retina. In the description below, each of the components is explained.

The position information acquisition unit 11 acquires three-dimensional position information about the composite diffraction element 20 placed in front of both eyes or one eye. The three-dimensional position information may be three-dimensional position information about the composite diffraction element 20 relative to the image projection device 10, or may preferably be three-dimensional position information about the composite diffraction element 20 relative to the projection optical system 12, for example.

In a case where the composite diffraction element is set in front of both eyes, the three-dimensional position information can more preferably be position information about the respective composite diffraction elements 20 placed in front of the right and left eyes, relative to the image projection device 10 (particularly, the projection optical system 12). That is, the three-dimensional position information can be position information about each of the composite diffraction element in front of the left eye and the composite diffraction element in front of the right eye. With this arrangement, it is possible to adjust the image display light on the basis of the parallax between the right and left eyes, and present not only a two-dimensional image but also a stereoscopic or three-dimensional image to the user.

The position information acquisition unit 11 can preferably acquire three-dimensional position information about both eyes, or more preferably three-dimensional position information about the pupils of both eyes. Using both the three-dimensional position information about the composite diffraction elements and the three-dimensional position information about both eyes, the image display light adjustment unit 14 can adjust the image display light on the basis of the three-dimensional position information about both eyes relative to the composite diffraction elements. Thus, the image display light can be adjusted to be more suitable for the user.

The three-dimensional position information about both eyes (particularly, the pupils of both eyes) can be position information about the composite diffraction elements 20, for example. More particularly, the three-dimensional position information about both eyes can include position information about the left eye relative to the composite diffraction element in front of the left eye, and position information about the right eye relative to the composite diffraction element in front of the right eye.

Further, the three-dimensional position information about both eyes (particularly, the pupils of both eyes) can include information about the positional relationship between the right and left eyes. The positional relationship information about the right and left eyes can include the distance between the right and left eyes (particularly, the distance between the pupils of the right and left eyes) and/or position information about the right and left eyes relative to each other, for example.

Further, the three-dimensional position information about both eyes can include information about the sizes of the pupils of the right and left eyes. The information can include the diameters or radiuses of the pupils and/or the areas of the pupils, for example.

Figure 20:
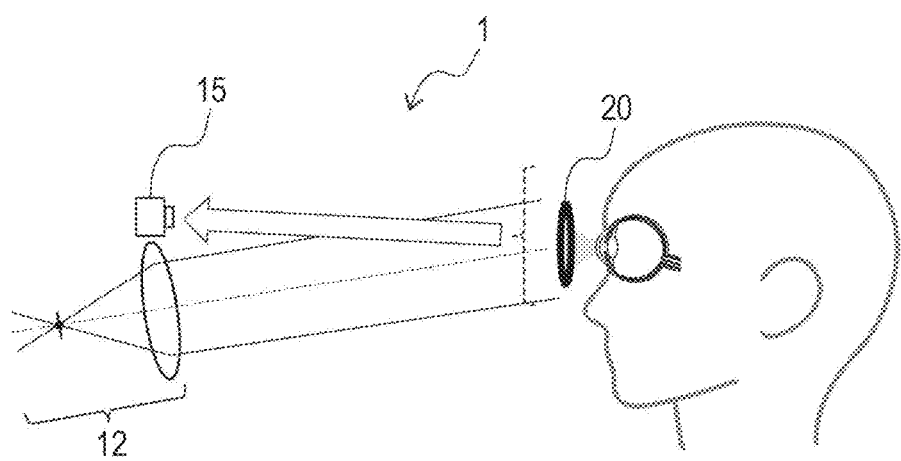
FIG. 20 is a diagram showing an example configuration of an optical detection device.

The position information acquisition unit 11 can include an optical detection device 15 such as an image sensor, for example. The image sensor may be a CMOS or a CCD, for example. For example, as shown in FIG. 20, with the optical detection device 15, an image of the composite diffraction elements 20 provided in front of both eyes can be acquired. The optical detection device 15 can be provided as part of the image projection device 10. That is, in the present technology, the position information acquisition unit can include an image sensor, and, on the basis of information obtained by the image sensor, or particularly, image information acquired by the image sensor, the position information acquisition unit 11 can acquire three-dimensional position information about the composite diffraction elements 20. The acquisition of the three-dimensional position information can be performed by an image processing unit 16 included in the position information acquisition unit 11. To acquire the three-dimensional position information, some other sensor such as a TOF sensor may be used, for example.

Further, the image normally includes images of both eyes. Accordingly, the position information acquisition unit 11 (particularly, the image processing unit 16) can acquire the three-dimensional position information about both eyes from the image.

In FIG. 12, the image processing unit 16 is shown as a different component from the control unit 13. However, the image processing unit 16 may be included in the control unit 13.

According to one embodiment of the present technology, the image processing unit 16 can acquire the three-dimensional position information about the composite diffraction elements 20 by a technique using a mark. For example, a mark for the image processing unit 16 to acquire the three-dimensional position information can be provided at a portion or in the periphery of the composite diffraction elements 20. Recognizing the mark in an image, the image processing unit 16 can acquire the three-dimensional position information about the composite diffraction elements 20.

According to another embodiment of the present technology, the image processing unit 16 can acquire the three-dimensional position information about both eyes by a pupil recognition technique. As the pupil recognition technique, a technique known in the art may be used.

Alternatively, the image processing unit 16 may acquire the three-dimensional position information about the composite diffraction elements and/or both eyes, by three-dimensionally measuring and/or learning the composite diffraction elements and/or both eyes.

According to one preferred embodiment of the present technology, the position information acquisition unit 11 can acquire the three-dimensional position information about the composite diffraction elements and/or both eyes in real time. As the three-dimensional position information acquired in real time is used, more accurate projection of the image display light becomes possible.

The image projection device 10 includes one projection optical system 12, and the projection optical system 12 can be designed to be capable of projecting image display light on a region covering both eyes. In the present technology, having one projection optical system can mean that the image display light that should reach both the right eye and the left eye is projected from the same projection optical system. For example, having one projection optical system may mean that there is one projection port to be used for projecting the image display light that should reach each of the eyes. For example, having one projection optical system may mean that the light sources for projecting the image display light that should reach each of the eyes are the same. As the image projection device forming the image projection system of the present technology includes only one projection optical system, the size and/or cost of the image projection device can be reduced.

Note that the image projection device 10 may include two projection optical systems.

The image display light to be projected from the projection optical system 12 may be light emitted by an LED or a CRT. The image display light can be laser light, for example.

In the present technology, more preferably, the image projectable region of the projection optical system can be designed so that an optical element stays within the region even if the three-dimensional position of the composite diffraction element changes due to shaking of the face or a hand, for example. As a result, even if the three-dimensional position of the composite diffraction element changes in a vertical direction, a horizontal direction, or a depth direction, the image display light adjustment unit adjusts the image display light so that the image display light can be projected onto the changed position.

The projection optical system 12 is designed to be able to project image display light adjusted by the image display light adjustment unit 14, toward the composite diffraction element 20. The type of the projection optical system to be adopted in the present technology may be selected as appropriate by a person skilled in the art, in accordance with the product concept or the like, for example.

According to one embodiment of the present technology, the projection optical system 12 may be designed to project image display light to both eyes with a magnifying optical system. The magnifying optical system is an optical system that is adopted in a microscope, a telescope, or the like, for example. According to another embodiment of the present technology, the projection optical system 12 may be designed so that image display light can be focused near the pupil and be emitted to the retina, to enable a Maxwell view. The magnifying optical system and the Maxwell-view optical system are described below with reference to FIGS. 13 and 14, respectively.

Figure 13:
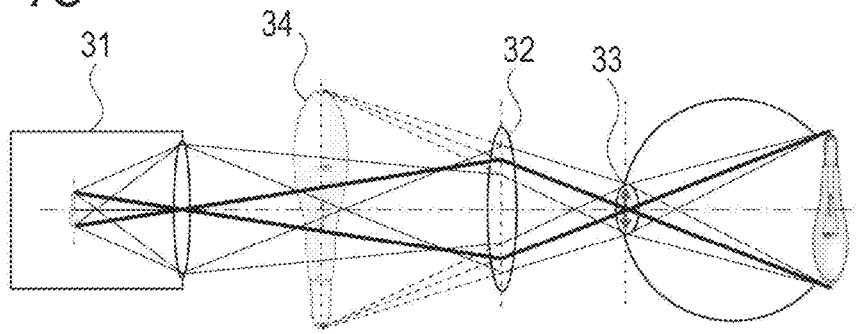
FIG. 13 is a diagram for explaining a magnifying optical system.

As shown in FIG. 13, in a magnifying optical system, image display light projected from an image projection device 31 reaches a pupil 33 through a composite diffraction element 32. The luminous flux of the image display light passes through the entire pupil 33 and is focused on the retina. Therefore, even in a case where the pupil 33 or the composite diffraction element 32 moves, it is easy to secure the field of view, and images do not easily disappear. Further, a virtual image 34 that appears to float in space is in focus at a fixed distance, and therefore, the recognized image can vary depending on the visual acuity of the user. A projection optical system that projects image display light with the magnifying optical system can include a light source unit such as an LED, and an image display unit such as a liquid crystal display, for example.

Figure 14:
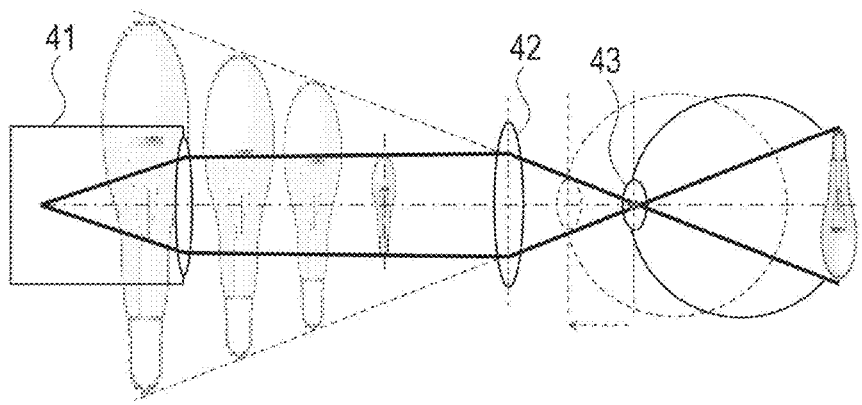
FIG. 14 is a diagram for explaining a Maxwell-view optical system.

As shown in FIG. 14, in a Maxwell-view optical system, image display light projected from an image projection device 41 reaches a pupil 43 through a composite diffraction element 42. The image display light is focused near the pupil and is emitted to the retina. In the Maxwell-view optical system, one dot (a minimum display unit) in a display image passes through one point on the crystalline lens, and accordingly, the image of the one dot on the retina is not easily affected by the condition of the crystalline lens. For example, even a user with myopia, hyperopia, astigmatism, or the like can clearly recognize images. Further, a virtual image that appears to float in space is focus-free, and the virtual image is in focus at any distance from the eye. In the Maxwell-view optical system, image display light may be focused near the pupil, may be focused on the pupil, or may deviate from the pupil about several mm to tens of mm (for example, 1 mm to 20 mm, or more particularly, 2 mm to 15 mm) in the optical axis direction, for example. As in the latter case, a Maxwell view can be realized even if the focus is not on the pupil. More specifically, the image display light can be focused on the pupil, in the crystalline lens, or between the corneal surface and the pupil. As the focus is moved in the optical axis direction, it is possible to prevent the user from missing the image even if the image moves. For example, like the pupil drawn with a dashed line in FIG. 14, the pupil can be moved to the front (the composite diffraction element side) of the convergence position of the image display light so that the user does not easily miss the image. A projection optical system that projects image display light with the Maxwell-view optical system can include a light source unit that outputs laser light and an optical scanning unit that two-dimensionally scans the output laser light, for example. The laser light can be output as a single luminous flux formed with red, green, and blue laser beams, for example. The optical scanning unit can include a MEMS mirror, for example. The optical scanning unit can move the direction of laser light at high speed so that an image is formed on the retina.

The image display light adjustment unit 14 adjusts image display light, on the basis of the three-dimensional position information acquired by the position information acquisition unit 11. Through the adjustment, the image display light projected onto each of the eyes becomes suitable for presenting a desired image to the user. For example, the image display light adjustment unit 14 can adjust at least one of the wavelength, the intensity, and the direction of the image display light. The image display light adjustment unit 14 can adjust the image display light so that the image is shifted or rotated, or the size or distortion of the image is adjusted, for example. The image display light adjustment unit 14 can preferably adjust the image display light on the basis of the binocular parallax.

According to a preferred embodiment of the present technology, the image display light adjustment unit 14 can adjust image display light so that different image display light is projected onto each of the eyes. For example, the image display light adjustment unit 14 adjusts image display light on the basis of the parallax between both eyes, so that different image display light is projected onto each of the eyes. As different image display light is projected onto each of the eyes, the user recognizes the three-dimensional position of the presented image with binocular vision, for example. For example, an image appears to float in the external scenery that the user is looking through eyeglasses.

As shown in FIG. 1, the composite diffraction element 20 is separated from the image projection device 10 and is placed in front of both eyes. The composite diffraction element 20 is used for diffracting the image display light projected from the image projection device 10, and guiding the image display light to both eyes. According to one embodiment of the present technology, the image projection device 10 may be located below the user's line-of-sight direction as shown in FIG. 1. Alternatively, the image projection device 10 may be located above the user's line-of-sight direction. The traveling direction of the image display light projected from the image projection device 10 is changed by the composite diffraction element 20, and is guided to both eyes of the user. As a result, the user can recognize the image formed with the image display light from the image projection device 10, without the image projection device 10 existing in the line-of-sight direction of the user. According to another embodiment of the present technology, the image projection device 10 may be located at a height close to the height of the line-of-sight direction of the user. In this case, the luminance of the image is adjusted, and/or the position at which the image is displayed is limited to a portion (for example, the upper half, the lower half, the left half, the right half, or the like) of the field of view, so that the user does not mind the overlap between the image projection device and the external scenery. Although the composite diffraction element 20 allows image display light to enter at a greater incident angle than 0° in FIG. 1, image display light in the present technology may enter the composite diffraction element 20 at an incident angle of 0° (or may enter vertically). In the latter case, the composite diffraction element described above in (3) may be used, for example.

The composite diffraction element 20 can preferably have such optical characteristics that the composite diffraction element 20 functions as a lens for light in the wavelength range of the image display light, and transmits light having a wavelength outside the wavelength range. Owing to the optical characteristics, the user can recognize a scenery in the line-of-sight direction through the composite diffraction element 20, for example, and can recognize an image formed with the image display light.

Figure 15:
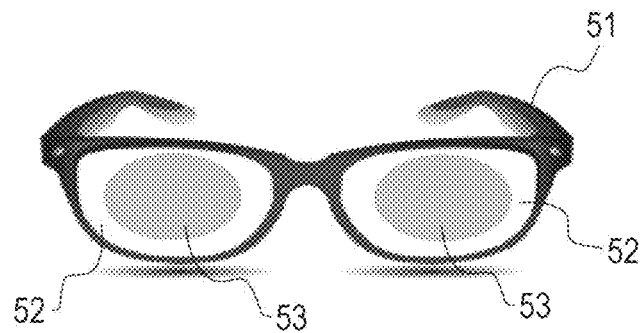
FIG. 15 is a diagram showing an example of eyeglasses equipped with composite diffraction elements according to the present technology.

The composite diffraction element 20 may be included in the instrument 21 for holding the element 20 in front of both eyes. That is, the optical element 20 can be held in front of both eyes by the instrument 21. The instrument can be eyeglasses, goggles, or a helmet, for example. For example, as shown in FIG. 15, a composite diffraction element 53 according to the present technology can be stacked on one surface (the surface on the external scenery side or the surface on the eyeball side) of each lens 52 of eyeglasses 51. Further, as the composite diffraction elements have the optical characteristics described above, the instrument 51 can be used for the original purpose of the instrument (as eyeglasses, for example) in a case where image projection is not being performed. The composite diffraction element 20 is attached to an instrument selected as appropriate by the user or a person skilled in the art, so that an image projection system according to the present technology can be used. Accordingly, the selection range of instruments that can be used in the present technology is very wide.

The instrument 21 preferably includes no projection optical systems. The instrument 21 may more preferably not include the components (such as the projection optical system, the power supply, and a device to be driven by electric power, for example) necessary for projecting image display light. As the instrument 21 is designed in this manner, it is possible to reduce the size and/or the weight of the instrument 21.

As described above regarding the image processing unit 16, a mark for the image processing unit 16 to acquire three-dimensional position information may be provided at a portion or in the periphery of the composite diffraction element 20. The number of marks may be one, two, three, four, or larger, for example. As a plurality of marks is used, more accurate three-dimensional position information can be acquired. The position of the mark can be selected so that the mark remains inconspicuous. With this arrangement, the head-mounted unit can be improved in terms of design.

Figure 16:
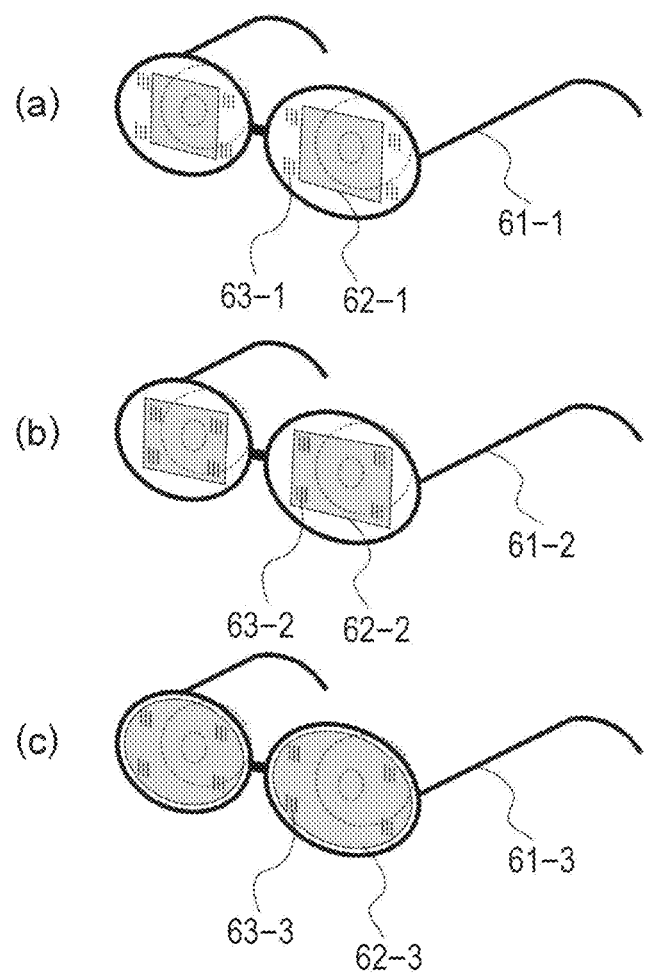
FIG. 16 is a diagram showing example shapes of composite diffraction elements according to the present technology.

Examples of the shapes of composite diffraction elements and examples of arrangement of marks are shown in FIG. 16.

As shown in FIG. 16(a), a composite diffraction element 62-1 according to the present technology is attached to a portion of a lens surface of eyeglasses 61-1. Four marks 63-1 are provided around the composite diffraction element 62-1. When the image processing unit 16 recognizes these marks 63-1, the three-dimensional position information about the composite diffraction element 62-1 is acquired. The marks 63-1 may be formed with holograms, reflective films, or infrared reflective films, for example, or may be a predetermined pattern or the like. In a case where the marks 63-1 are infrared reflective films, the position information acquisition unit can include an infrared projection device and an infrared detection device.

As shown in FIG. 16(b), a composite diffraction element 62-2 according to the present technology may be attached to a portion of a lens surface of eyeglasses 61-2. In FIG. 16(b), marks 63-2 are provided on the respective four corners in the composite diffraction element 62-2.

As shown in FIG. 16(c), a composite diffraction element 62-3 according to the present technology may be attached to an entire surface of a lens of eyeglasses 61-3. In this case, four marks 63-3 are provided in the composite diffraction element 62-3 according to the present technology.

Figure 17:
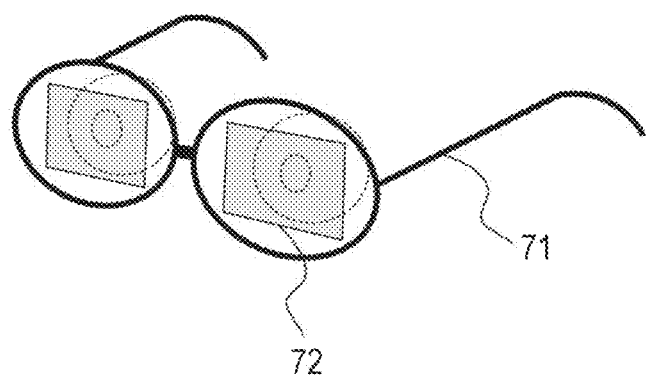
FIG. 17 is a diagram showing an example of eyeglasses equipped with composite diffraction elements according to the present technology.

As described above regarding the image processing unit 16, the three-dimensional position information about the optical element for image display light diffraction and/or both eyes may be acquired through three-dimensional measurement or learning of the optical element for image display light diffraction and/or both eyes. In this case, the marks are unnecessary. Accordingly, as shown in FIG. 17, for example, eyeglasses 71 to which composite diffraction elements 72 according to the present technology are simply attached can constitute a system according to the present technology.

Figure 18:
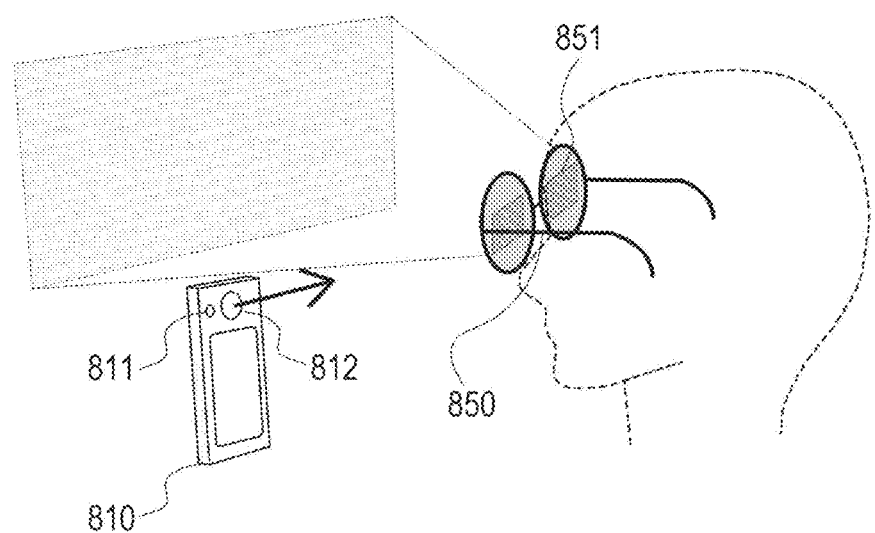
FIG. 18 shows an example state in which a user is using an image projection system according to the present technology including an image projection device that is a smartphone.

The image projection device 10 may be a portable device such as a smartphone, a mobile phone, or a watch-like terminal, for example. As such a portable device is adopted as an image projection device in an image projection system of the present technology, image projection according to the present technology becomes possible with a small or ultrasmall mobile device. FIG. 18 shows an example state in which a user is using an image projection system according to the present technology including an image projection device that is a smartphone. Eyeglasses 850 are mounted on the user's head portion, and composite diffraction elements 851 according to the present technology are attached to the lenses of the eyeglasses 850. The user also holds a smartphone 810 in his/her hand, for example.

The smartphone 810 is equipped with an image sensor (a camera) 811. The image sensor 811 acquires the three-dimensional position information about the composite diffraction elements 851 located in front of both eyes of the user and, if necessary, the three-dimensional position information about both eyes. On the basis of the three-dimensional position information, the position information acquisition unit in the smartphone 810 adjusts image display light. The adjusted image display light is projected from a projection port 812 of the smartphone 810 toward the composite diffraction elements 851. The image display light is diffracted by the composite diffraction elements 851 and reaches both eyes of the user. As a result, the user recognizes the image superimposed on the external scenery.

The composite diffraction elements 851 can also have such optical characteristics that the composite diffraction elements 851 function as lenses for light in the wavelength range of the image display light, and transmit light having a wavelength outside the wavelength range. As a result, the image formed with the image display light is superimposed on the external scenery.

(2) Example Configuration of an Image Projection Device

Figure 19:
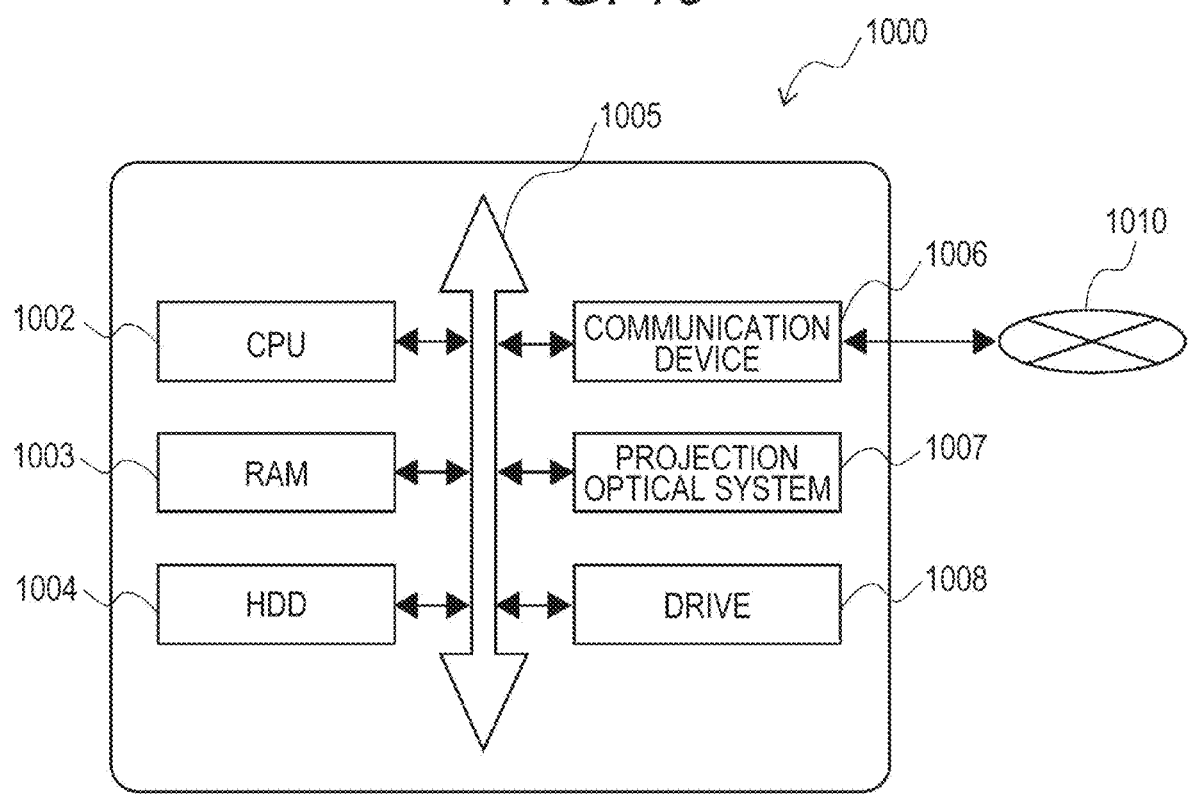
FIG. 19 is a diagram showing an example configuration of an image projection device forming an image projection system of the present technology.

In the description below, an example configuration of an image projection device forming an image projection system of the present technology is explained, with reference to FIG. 19. FIG. 19 is a diagram showing an example schematic configuration of an image projection device according to the present technology.

An image projection device 1000 shown in FIG. 19 includes a central processing unit (CPU) 1002 and a RAM 1003. The CPU 1002 and the RAM 1003 are connected to each other via a bus 1005, and are also connected to the other components of the image projection device 1000 via the bus 1005.

The CPU 1002 controls the image projection device 1000 and performs arithmetic operations. Any appropriate processor can be used as the CPU 1002, and examples thereof include processors of the Snapdragon (registered trademark) series, the Xeon (registered trademark) series, the Core (registered trademark) series, and the Atom (registered trademark) series. The functions of the control unit 13, the image display light adjustment unit 14, and the image processing unit 16 of the image projection device 10 described above with reference to FIG. 12 can be achieved by the CPU 1002, for example.

The RAM 1003 includes a cache memory and a main memory, for example, and can temporarily store programs to be used by the CPU 1002.

The image projection device 1000 may also include a disk 1004, a communication device 1006, a projection optical system 1007, and a drive 1008. Any of these components can be connected to the bus 1005.

The disk 1004 can store an operating system (WINDOWS (registered trademark), UNIX (registered trademark), LINUX (registered trademark), or the like, for example), a program for implementing a video projection method according to the present technology, a program for performing a position information acquisition process, a program for adjusting image display light, and various other programs, as well as various kinds of data (image data, for example).

The communication device 1006 connects the image projection device 1000 to a network 1010 in a wired or wireless manner. The communication device 1006 can acquire various kinds of data (image data and the like, for example) from the image projection device 1000 via the network 1010. The acquired data can be stored into the disk 1004, for example. The type of the communication device 1006 may be selected as appropriate by a person skilled in the art. The disk 1004 may be a semiconductor recording medium or the like such as a flash memory, for example, and is not limited to any particular kind.

The projection optical system 1007 can project image display light toward a composite diffraction element according to the present technology.

The drive 1008 can read the information recorded in a recording medium, and output the information to the RAM 1003. The recording medium is a microSD memory card, an SD memory card, or a flash memory, for example, but is not limited to these examples.

Note that the present technology may also be embodied in the configurations described below.

[1] A composite diffraction element including
a stack structure including a first diffraction element, a second diffraction element, and a third diffraction element in this order,
in which the second diffraction element diffractively reflects light that has passed through the first diffraction element and reached the second diffraction element, toward the first diffraction element,
the first diffraction element diffractively reflects the light diffractively reflected by the second diffraction element, toward the third diffraction element, and
the third diffraction element transmits the light diffractively reflected by the first diffraction element, and diffractively reflects zeroth-order light that has passed through the first diffraction element and the second diffraction element.

[2] The composite diffraction element according to [1], in which the third diffraction element diffractively reflects the zeroth-order light that has passed through the first diffraction element and the second diffraction element, in a direction in which the zeroth-order light is transmitted by both the first diffraction element and the second diffraction element.

[3] The composite diffraction element according to [1] or [2], in which the composite diffraction element as a whole has optical characteristics of a transmissive diffraction element.

[4] The composite diffraction element according to any one of [1] to [3], in which the composite diffraction element as a whole has optical characteristics of a transmissive diffraction lens.

[5] The composite diffraction element according to any one of [1] to [4], which has a structure in which two sets of the stack structures are stacked.

[6] The composite diffraction element according to [5], in which
one stack structure of the two sets of the stack structures has optical characteristics of a transmissive diffraction element, and the other stack structure has optical characteristics of a transmissive diffraction lens, and
light obtained by diffraction performed by the one stack structure enters the other stack structure, and the other stack structure diffracts and condenses the light.

[7] The composite diffraction element according to any one of [1] to [6], in which the first diffraction element, the second diffraction element, and the third diffraction element each diffract light of a plurality of wavelengths.

[8] The composite diffraction element according to any one of [1] to [7], in which at least one of the first diffraction element, the second diffraction element, and the third diffraction element is a stack of a plurality of diffraction element layers.

[9] The composite diffraction element according to any one of [1] to [8], in which a transparent plate is inserted in the stack structure.

[10] The composite diffraction element according to any one of [1] to [8], in which the first diffraction element, the second diffraction element, and the third diffraction element are stacked on one surface of a transparent plate.

[11] The composite diffraction element according to any one of [1] to [10], which is placed for use in front of an eye, and is used for diffracting image display light to reach the eye.

[12] The composite diffraction element according to [11], in which the image display light is emitted from an image projection device separated from the composite diffraction element.

[13] The composite diffraction element according to any one of [1] to [12], in which the first diffraction element, the second diffraction element, and the third diffraction element are all reflective holograms.

[14] An instrument including:
a composite diffraction element that includes a stack structure including a first diffraction element, a second diffraction element, and a third diffraction element in this order,
the second diffraction element diffractively reflecting light that has passed through the first diffraction element and reached the second diffraction element, toward the first diffraction element,
the first diffraction element diffractively reflecting the light diffractively reflected by the second diffraction element, toward the third diffraction element,
the third diffraction element transmitting the light diffractively reflected by the first diffraction element, and diffractively reflecting zeroth-order light that has passed through the first diffraction element and the second diffraction element; and
a transparent plate for placing the composite diffraction element in front of an eye.

[15] An image projection system including:
a composite diffraction element that includes a stack structure including a first diffraction element, a second diffraction element, and a third diffraction element in this order,
the second diffraction element diffractively reflecting light that has passed through the first diffraction element and reached the second diffraction element, toward the first diffraction element,
the first diffraction element diffractively reflecting the light diffractively reflected by the second diffraction element, toward the third diffraction element,
the third diffraction element transmitting the light diffractively reflected by the first diffraction element, and diffractively reflecting zeroth-order light that has passed through the first diffraction element and the second diffraction element; and
an image projection device that projects image display light toward the composite diffraction element.

REFERENCE SIGNS LIST

150 Composite diffraction element
101 First diffraction element
102 Second diffraction element
103 Third diffraction element

The invention claimed is:

1. A composite diffraction element, comprising:
a stack structure including a first diffraction element, a second diffraction element, and a third diffraction element in this order,
wherein the first diffraction element transmits light incident on the first diffraction element within at least a first range of angles,
wherein the second diffraction element diffractively reflects light incident on the second diffraction element within at least a second range of angles that has passed through the first diffraction element and reached the second diffraction element, toward the first diffraction element, wherein an exit angle of the light incident on the second diffraction element within at least the second range of angles and reflected by the second diffraction element is greater than an incident angle of the light incident on the second diffraction element within at least the second range of angles, wherein the first diffraction element diffractively reflects the light diffractively reflected by the second diffraction element, toward the third diffraction element, wherein the second diffraction element transmits the light that has been reflected by the first diffraction element toward the third diffraction element, wherein the third diffraction element transmits the light diffractively reflected by the first diffraction element and transmitted by the second diffraction element, and diffractively reflects zeroth-order light that has passed through the first diffraction element and the second diffraction element, and wherein an exit angle of the zeroth-order light that has passed through the first diffraction element and the second diffraction element and that is reflected by the third diffraction element is greater than an incident angle of the zeroth-order light that has passed through the first diffraction element and the second diffraction element on the third diffraction element, and wherein the exit angle of light incident on the third diffraction element is greater than the exit angle of light incident on the second diffraction element.

2. The composite diffraction element according to claim 1, wherein the third diffraction element diffractively reflects the zeroth-order light that has passed through the first diffraction element and the second diffraction element, in a direction in which the zeroth-order light is transmitted by both the first diffraction element and the second diffraction element.

3. The composite diffraction element according to claim 1, wherein the composite diffraction element as a whole has optical characteristics of a transmissive diffraction lens.

4. The composite diffraction element according to claim 1, which has a structure in which two sets of the stack structures are stacked.

5. The composite diffraction element according to claim 4, wherein a first stack structure of the two sets of the stack structures has optical characteristics of a transmissive diffraction element, and a second stack structure of the two sets of the stack structures has optical characteristics of a diffraction lens, and light obtained by diffraction performed by the first stack structure enters the second stack structure, and the second stack structure diffracts and condenses the light.

6. The composite diffraction element according to claim 1, wherein the first diffraction element, the second diffraction element, and the third diffraction element each diffract light of a plurality of wavelengths.

7. The composite diffraction element according to claim 1, wherein at least one of the first diffraction element, the second diffraction element, and the third diffraction element is a stack of a plurality of diffraction element layers.

8. The composite diffraction element according to claim 1, wherein a transparent plate is connected to the stack structure.

9. The composite diffraction element according to claim 1, wherein the first diffraction element, the second diffraction element, and the third diffraction element are stacked on one surface of a transparent plate.

10. The composite diffraction element according to claim 1, wherein the first diffraction element, the second diffraction element, and the third diffraction element include holograms.

11. The composite diffraction element according to claim 1, wherein the exit angle of light incident on the third diffraction element is at least 1 degree greater than the exit angle of light incident on the second diffraction element.

12. The composite diffraction element according to claim 1, wherein the exit angle of light incident on the third diffraction element is at least 5 degrees greater than the exit angle of light incident on the second diffraction element.

13. The composite diffraction element according to claim 1, wherein a difference between the exit angle of light incident on the second diffraction element within at least the second range of angles and reflected by the second diffraction element is at least 5 degrees greater than the incident angle of the light incident on the second diffraction element within at least the second range of angles.

14. An instrument, comprising:

a composite diffraction element that includes a stack structure including a first diffraction element, a second diffraction element, and a third diffraction element in this order, wherein the first diffraction element transmits light incident on the first diffraction element within at least a first range of angles, wherein the second diffraction element diffractively reflects light incident on the second diffraction element within at least a second range of angles that has passed through the first diffraction element and reached the second diffraction element, toward the first diffraction element, wherein an exit angle of the light incident on the second diffraction element within at least the second range of angles and reflected by the second diffraction element is greater than an incident angle of the light incident on the second diffraction element within at least the second range of angles, wherein the first diffraction element diffractively reflects the light diffractively reflected by the second diffraction element, toward the third diffraction element, wherein the second diffraction element transmits the light that has been reflected by the first diffraction element toward the third diffraction element, wherein the third diffraction element transmits the light diffractively reflected by the first diffraction element, and diffractively reflecting zeroth-order light that has passed through the first diffraction element and the second diffraction element, wherein an exit angle of the zeroth-order light that has passed through the first diffraction element and the second diffraction element and that is reflected by the third diffraction element is greater than an incident angle of the zeroth-order light that has passed through the first diffraction element and the second diffraction element on the third diffraction element, and wherein the exit angle of light incident on the third diffraction element is greater than the exit angle of light incident on the second diffraction element; and a transparent plate for placing the composite diffraction element in front of an eye.

15. An image projection system, comprising:

a composite diffraction element that includes a stack structure including a first diffraction element, a second diffraction element, and a third diffraction element in this order, wherein the first diffraction element transmits light incident on the first diffraction element within at least a first range of angles, wherein the second diffraction element diffractively reflecting light incident on the second diffraction element within at least a second range of angles that has passed through the first diffraction element and reached the second diffraction element, toward the first diffraction element, wherein an exit angle of the light incident on the second diffraction element within at least the second range of angles and reflected by the second diffraction element is greater than an incident angle of the light incident on the second diffraction element within at least the second range of angles, wherein the first diffraction element diffractively reflecting the light diffractively reflected by the second diffraction element, toward the third diffraction element, wherein the second diffraction element transmits the light that has been reflected by the first diffraction element toward the third diffraction element, wherein the third diffraction element transmitting the light diffractively reflected by the first diffraction element, and diffractively reflecting zeroth-order light that has passed through the first diffraction element and the second diffraction element, wherein an exit angle of the zeroth-order light that has passed through the first diffraction element and the second diffraction element and that is reflected by the third diffraction element is greater than an incident angle of the zeroth-order light that has passed through the first diffraction element and the second diffraction element on the third diffraction element, and wherein the exit angle of light incident on the third diffraction element is greater than the exit angle of light incident on the second diffraction element; and an image projection device that projects image display light toward the composite diffraction element.

* * * * *